(12) United States Patent
Mantry et al.

(10) Patent No.: US 10,143,229 B2
(45) Date of Patent: Dec. 4, 2018

(54) FOOD PREPARATION DEVICES, SYSTEMS, AND METHODS

(71) Applicant: ZimplyFresh, LLC, Salt Lake City, UT (US)

(72) Inventors: Malavika Mantry, Mason, OH (US); Manju Karthikeyan, Salt Lake City, UT (US); Narayan Tripunithura Mahadeva, Buffalo Grove, IL (US)

(73) Assignee: ZimplyFresh, LLC, Salt Lake City, UT (US)

( * ) Notice: Subject to any disclaimer, the term of this patent is extended or adjusted under 35 U.S.C. 154(b) by 0 days.

(21) Appl. No.: 14/837,814

(22) Filed: Aug. 27, 2015

(65) Prior Publication Data

US 2016/0058065 A1    Mar. 3, 2016

Related U.S. Application Data

(60) Provisional application No. 62/042,781, filed on Aug. 27, 2014.

(51) Int. Cl.
*A23P 30/00* (2016.01)
*A23P 30/10* (2016.01)

(52) U.S. Cl.
CPC ............ *A23P 30/00* (2016.08); *A23P 30/10* (2016.08)

(58) Field of Classification Search
CPC .. B65D 81/34; A23P 1/10; A23P 30/10; A23P 30/00
See application file for complete search history.

(56) References Cited

U.S. PATENT DOCUMENTS

| | | |
|---|---|---|
| 4,338,766 A | 7/1982 | Hamilton |
| 6,060,088 A | 5/2000 | Akimoto |
| 6,520,070 B1 | 2/2003 | Heczko |
| 6,539,841 B1 | 4/2003 | Spasovski |
| 6,698,504 B2 * | 3/2004 | Briesmeister ............ A23L 3/02 126/263.07 |
| 7,458,195 B2 * | 12/2008 | Bezek ...................... B65B 9/20 493/254 |
| 8,460,732 B2 | 6/2013 | Stalder et al. |
| 2002/0121527 A1 | 8/2002 | Good |
| 2003/0089740 A1 | 5/2003 | Gutierrez et al. |
| 2006/0127549 A1 | 6/2006 | Murray |

(Continued)

FOREIGN PATENT DOCUMENTS

| | | |
|---|---|---|
| EP | 1532866 A1 | 5/2005 |
| EP | 2745757 A1 | 6/2014 |

OTHER PUBLICATIONS

Extended European search report dated May 7, 2018, in EP Application No. 15836890.2, filed Aug. 27, 2015; 6 pages.

*Primary Examiner* — Anshu Bhatia
(74) *Attorney, Agent, or Firm* — Thorpe North & Western, LLP; David W. Osborne

(57) ABSTRACT

A food preparation device is disclosed. The food preparation device can include an ingredient combining apparatus to introduce a fluid food ingredient and a solid food ingredient to one another within a package. The food preparation device can also include a mixing apparatus to mix the fluid food ingredient and the solid food ingredient to form a food mixture in the package. In addition, the food preparation device can include a forming apparatus to form the food mixture into a predetermined shape within the package.

20 Claims, 24 Drawing Sheets

(56) References Cited

U.S. PATENT DOCUMENTS

| | | |
|---|---|---|
| 2009/0214737 A1 | 8/2009 | Kelly |
| 2009/0233334 A1* | 9/2009 | Hildinger ............... C12M 23/14 |
| | | 435/71.1 |
| 2010/0112146 A1 | 5/2010 | Zoss |
| 2011/0139809 A1 | 6/2011 | Sawh et al. |
| 2011/0151083 A1 | 6/2011 | Soucy et al. |
| 2011/0171356 A1 | 7/2011 | Mattson et al. |
| 2011/0244108 A1 | 10/2011 | Rabin |
| 2012/0183650 A1 | 7/2012 | Liske |
| 2012/0321756 A1 | 12/2012 | Estabrook et al. |
| 2012/0328747 A1 | 12/2012 | Levy |

* cited by examiner

FOOD PREPARATION DEVICES, SYSTEMS, AND METHODS

PRIORITY DATA

This application claims the benefit of U.S. Provisional Patent Application Ser. No. 62/042,781, filed on Aug. 27, 2014, which is incorporated herein by reference.

BACKGROUND OF THE INVENTION

Food consumers often desire a nutritionally relevant snack or meal to meet specific dietary requirements, such as a need for immediate energy through carbohydrate, muscle mass and recovery through protein, specific nutritional components (i.e., vitamins, minerals, fiber, and whole grains, or delivering specific health and lifestyle benefits including antioxidant or weight management properties). In addition, consumers often crave a product that is highly palatable due to its freshness, moistness, softness, and warmth at consumption.

SUMMARY OF THE INVENTION

Although fresh, moist, warm foods are desirable to consume, such foods are not typically available without significant pre-work, preparation (e.g., ingredient selection, and weighing), and manufacture (e.g., heating, cooling, mixing, and shaping/molding) in the home or other location. A warm, moist, fresh tasting snack is currently not believed to be available in a convenient, single serve form while also providing and meeting nutritional and lifestyle needs.

In one invention embodiment, a food preparation device is provided. In some embodiments, the food preparation device can include an ingredient combining apparatus to introduce a fluid food ingredient and a solid food ingredient to one another within a package. The food preparation device can also include a mixing apparatus to mix the fluid food ingredient and the solid food ingredient to form a (more or less homogeneous or non-homogeneous) food mixture in the package. In addition, the food preparation device can include a forming apparatus to form the food mixture into a predetermined shape within the package.

Additional invention embodiments encompass a food preparation system. In some aspects, such a system can include a package having a solid food ingredient disposed therein. Additionally, such a system can include a food preparation device as recited herein, for example, that includes an ingredient combining apparatus to introduce a fluid food ingredient and the solid food ingredient to one another within the package. The food preparation device can also include a mixing apparatus to mix the fluid food ingredient and the solid food ingredient to form a food mixture in the package. In addition, the food preparation device can include a forming apparatus to form the food mixture into a predetermined shape within the package.

Yet additional invention embodiments encompass methods for preparing a food product. The method can include obtaining a package having a solid food ingredient disposed therein. The method can also include introducing a fluid food ingredient and the solid food ingredient to one another within the package. The method can further include mixing the fluid food ingredient and the solid food ingredient to form a food mixture in the package. Additionally, the method can include forming the food mixture into a predetermined shape within the package. In some embodiments, the food may be mixed and food product formed in a package without opening the package (i.e. the package is unopened, or is substantially closed and/or sealed).

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

DETAILED DESCRIPTION OF THE INVENTION

Definitions

Figure 1:
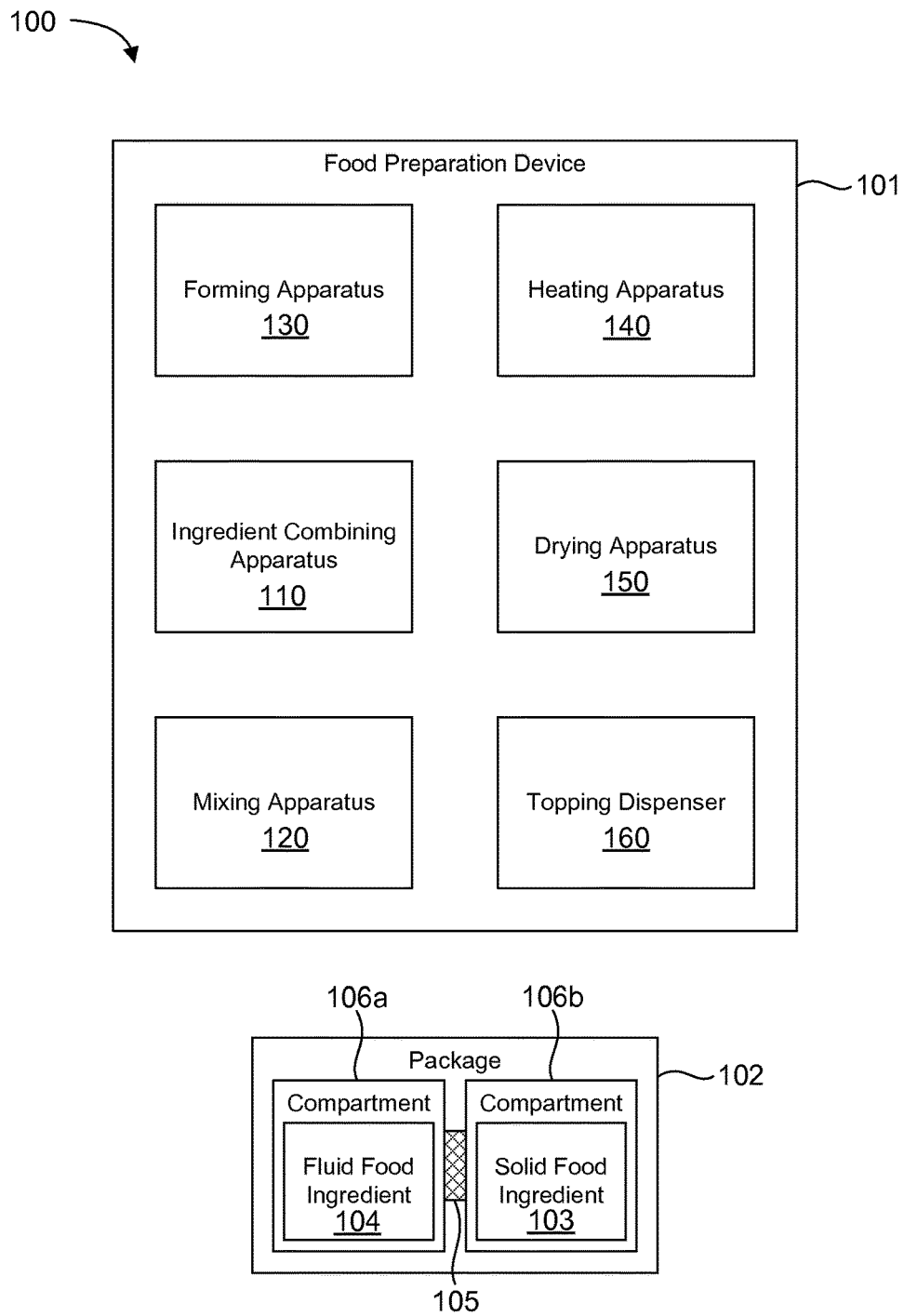
FIG. 1 is a schematic illustration of a food preparation system, in accordance with an example of the present disclosure.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a sensor" includes a plurality of such sensors.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms." Furthermore, it is to be understood that in this specification support for actual numerical values is provided even when the term "about" is used therewith. For example, the recitation of "about" 30 should be construed as not only providing support for values a little above and a little below 30, but also for the actual numerical value of 30 as well.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

Example Embodiments

With reference to FIG. 1, a food preparation system 100 in accordance with an example of the present disclosure can include a food preparation device 101 and a package 102 having a solid food ingredient 103 disposed therein. The food preparation device 101 can have an ingredient combining apparatus 110 to introduce a fluid food ingredient 104 and the solid food ingredient 103 to one another within the package 102. The food preparation device 101 can also include a mixing apparatus 120 to mix the fluid food ingredient 104 and the solid food ingredient 103 to form a food mixture in the package 102. Mixing can be accomplished in any suitable manner, such as by shaking and/or mechanical manipulation (e.g., stirring, magnetic mixing, sonication, orbital mixing, etc.). In addition, the food preparation device 101 can include a forming apparatus 130 to form the food mixture into a predetermined shape within the package 102. Advantageously, the food preparation system 100 can allow pre-selected and pre-weighed ingredients to be contained in the package 102 from the time of deposit into the package, through the storage shelf life to the time of manufacture, at which time the ingredients are formed into a food product. Furthermore, the finished food product can remain in the package 102 up to the time of consumption.

In one aspect, the fluid food ingredient 104 and/or the solid food ingredient 103 can be disposed in one or more packages or containers, which can be configured to facilitate preparation of a food product therein (e.g., by being flexible) and disposable to minimize or eliminate cleaning of the food preparation device 101. In this regard, the device can be configured so as to not ever require any cleaning, or can alternatively be configured to allow for or otherwise require periodic cleaning. In this latter case, in some embodiments the cleaning required may be provided for as function performed by the device, which can be for example, automatic, or can be manually initiated and controlled. In a particular aspect, the solid food ingredient 103 can be contained within the package, at least in part, by one or more frangible seals 105. More particularly, the fluid food ingredient 104 and the solid food ingredient 103 can be initially contained or disposed in the package 102 within separate compartments 106a, 106b of the package formed at least in part by separations or seals including one or more frangible seals 105.

The food preparation device 101 can include a heating apparatus 140 configured to heat the fluid food ingredient 104 and/or the solid food ingredient 103. The heating apparatus 140 can heat the fluid food ingredient 104 and/or the solid food ingredient 103 sufficient to facilitate homogeneously mixing the fluid food ingredient and the solid food ingredient, and insufficient to cook the fluid food ingredient and the solid food ingredient. The food preparation device 101 can also include a drying apparatus 150 to remove moisture from the food mixture (e.g., dry the food mixture), which can make the food mixture less sticky by changing the state of moisture or removal of moisture. In addition, the food preparation device 101 can include a topping dispenser 160 to apply a topping to the food mixture formed, once formed in the predetermined shape.

In some embodiments, aspects of which are described herein, the food preparation device 101 can include a receptacle, a holding element, a heating element, a piercing or cutting element, a shaking element, an air and/or vacuum pump, a kneading element, a pushing element (to allow the package or container with raw ingredients to either be pushed to a different region in the device or to push it to move/adjust all the ingredients in the package or container to be tightly placed prior to a molding step), a folding/turning element (to allow the package or container with raw ingredients to be pressed and turned so as to create a snack/bar as explained below), a molding element (to render a desired shape to the finished product), a drying element (to dry or harden the finished product), a cooling element (to harden or cool the finished product), a cleaning unit or made of non-stick material, and/or a spraying or drizzling element (to enrobe a finished product via for example a chocolate sauce or honey or other such topping).

The food preparation device 101 can include the receptacle for receiving the package or container (e.g., a pouch, sack, bag, case, pod, wrapper, etc.) that can have a lid that can actuate the manufacturing process via opening and closing operations either through manual or electronic means. Alternatively, the device 101 can be configured to store a type of wax paper which the user would place at the reception to receive the finished product. The holding element can keep the package or container in place such that the package or container is free at one end (the vertically lower portion in the case of a bag with two compartments placed vertically one of top of each other, or one of the lateral ends in the case of a bag with two or more compartments place horizontally next to each other). The shaking element can shake and mix the contents within the free end of the bag, which can be done with or without the aid of an air and/or vacuum pump. The heating element can heat the fluid component. The piercing or cutting element can pierce or cut the wall between compartments so as to allow the contents of one of the compartments to be mixed with the contents of the other compartment, as discussed in more detail hereinafter. The kneading element can allow homogeneous mixing of the fluid component with the solid ingredients. The pushing element can ensure that all the ingredients in the package or container can be pulled off the walls of the package or container and pushed to one end of the sac or bag. The molding element (pushing and pressing) in combination with a folding and turning element can mold the finished product within the sac or bag such that it obviates the need for cleaning by the user. The drying element (with or without vacuum) can help the finished product complete the binding process and or deliver the product. The enrobing element can allow a desired substance to add flavor or nutritional properties be drizzled, poured, or sprayed, where a separate package or container having an enrobing substance can be used. The freezing element can also be used to deliver a molded product without stickiness.

A single or multiple compartment package or container can hold selective ingredients of the recipe in each of the compartments for desired functionality, packaged shelf life at room temperature, as well as taste and nutrition quality. The package or container can also serve to contain ingredients during preparation or manufacture and/or as the package or wrapper for the finished product. A two compartment package or container, for instance, can be distinguished as serving to hold the solid ingredients (e.g., dry, particulate, powder, dried fruits, nuts, pre-cooked ingredients, etc.) in one compartment or section (A) while the fluid ingredients (e.g., liquid or viscous components) can be held in a second compartment or section (B). The amount of solids and liquid in a given package can be any amount or type needed to achieve a specific finished product or follow a given recipe. However, in one example solids as a function of the total package may account for greater than 5% of the volume of the package or container. In another example, a volume of the package or container can be 180 cm$^3$. Furthermore, a single or multiple compartment package or container can include flexible and/or rigid portions.

In one aspect, two compartments can be positioned vertically one above the other, where section A can represent the top or bottom section. For example, section A can represent the bottom compartment and section B can represent the top compartment. In another aspect, two compartments can be positioned horizontally next to each other, where both sections are in a side by side or parallel configuration. In practice, nearly any arrangement or relationship between the sections or compartments that allows proper combining of ingredients and formation into a suitable food product using a device as recited herein can be used. An opening can be opened or formed between the compartments to facilitate passage of the contents of section B into section A, such as by a manual or machine actuated piercing, puncturing, cutting action, and/or breaking of a frangible seal between the compartments. Thus, liquids can be evacuated into a section holding solids via gravity (in a vertical configuration) and/or a mechanically applied force. In one aspect, burst pouches or containers that have a seal between the solid and fluid compartments may be broken in any suitable manner, such as with pressure, air, steam, vacuum, microwave energy, or heat.

In one aspect, section B can be made of materials that are heat tolerant or heat resistant (such as heat resistant silicone) so as to allow mild heating of its contents, namely the liquid/viscous binding/sweetening agents, and cause these components to flow freely. Section A and/or section B can be made of material that is resistant to application of pressure, pull, or other type of force and avoid potential tearing as a result of ingredients piercing through the material during mixing and molding. This can allow the device to remain a clean-free state. Section A and/or section B can be made of material and/or have a coating that does not allow their contents to be visible from the outside unless cut open to reveal contents. In one aspect, the compartment that corresponds to section B can have an inner layer pre-coated with oil, glycerin, or some other non-stick material. Section A and/or section B may be manufactured using materials with a high moisture and oxygen barrier and creating a package or container that has an extremely dry internal environment. The packages or containers can be packaged with raw ingredients under a nitrogen flush to prevent oxidative degradation during shelf life. The package or container can be made of a flexible type of material to allow both placing the package or container in to the device, to be pressed and folded, and to be released appropriately subsequent to product manufacture. Because the package or container can serve as the finished package as well, it may be equipped with a re-sealable or rip-able capability at one of its ends or corners for consumer ease. The container can also be used as the delivery package after product manufacture to allow the consumer to safely hold and carry the finished product.

Alternatively, the fluid set and solid set of ingredients can be made available in separate packages or containers, which would then be used with a device compatible for insertion of two separate packages or containers. For example, the food preparation system can include containers (i.e., tanks, vats, etc.) of ingredients where the fluid food ingredient and/or the solid food ingredient can be stored until use, such as within the food preparation device. In one aspect, delivery of the fluid and/or solid food ingredient can be automated.

In operation, a user can place a multi-compartment package or container in a receptacle within a food preparation device. The package or container can be used for storage and transport of appropriate raw ingredients, as the preparation container to convert the set of ingredients in to a finished meal or snack product of desired taste, form/shape, temperature, and nutritional potential, and as the packaging material for the finished product. Subsequently, the fluid component can be slightly heated/warmed with or without direct contact with the heating source, such that the fluid component can flow either by force of gravity or mechanical aid, which can facilitate addition of the fluid component into the solid component, mixing, binding, molding, and/or shaping. The specific temperature depends on the specific ingredient or combination of ingredients. For example, a temperature of greater than 120 degrees F. may be suitable for a mixture of honey, brown rice syrup, and oil in approximately a 35:35:30 ratio. Alternatively, the temperature increase or change in flow behavior of the fluid component may be the consequence of non-thermal forces, such as pressure, friction, etc.

In one aspect, no water may be added in the process and therefore no direct hydration of ingredients is involved. Instead, wet or fluid ingredients that have moisture can be used. However, that moisture may be unavailable or is bound and cannot be used for hydration in the conditions.

In another aspect, the fluid food ingredient can comprise only water. Typically, bars cannot tolerate much water due to the need to maintain a low water activity to prolong shelf life. However, in this case, because the food product is made at the point of consumption, water activity is not a limiting factor. Thus, the food product can comprise a gel, a pudding, a soup, a sauce, a dressing, or any food product that may involve mixing of fluid and solid components (e.g., for rehydrating, facilitating mixing, or otherwise contributing to the formation of a final food product), etc.

In one aspect, the fluid and/or solid ingredients can be heated. For example, the fluid ingredients can be heated and then mixed with the solid ingredients. In another example, solid ingredients can be heated and combined with the fluid ingredients to warm the fluid ingredients so as to be fluid enough to mold. In a particular aspect, the fluid set of ingredients can be heated up just enough to effect pourability (transferability) due to a lower viscosity and then mixed with a solid set of ingredients. Heat may be used for two functions. First, to make the fluid set of ingredients flowable (and ultimately to mix homogenously and allow for binding) and second, to deliver a drier product and one that maybe a slightly warmer product to the consumer than the packaged product counterpart currently available for sale in the market. Amount of heat used insufficient to cook, but sufficient to help with shaping, agglomerating, and/or providing a warm food product.

The compartment containing the solid raw ingredients can be shaken or disturbed mechanically so as to mix all the ingredients (which may settle down based on particle size and weight during transport and storage) to a homogeneous or non-homogeneous blend prior to addition of the fluid component. The shaking or mechanical disturbance can also be availed to specifically release powdered ingredients that may be stuck in the corners of a bag or sac holding all of the ingredients. Mixing can occur in the ingredient container, a separate disposable container, an ingredient package, a finished product package, and/or a washable container. Mixing driven by motion along a single axis can result in good blending of solid and fluid components, and along multiple axes may improve the result. An orbital motion can result in single or multiple spherical forms, which can then be molded in to any desired shape including a triangular wedge-like shape. Pressure used can be very low, just enough to mix and mold. If ingredients are in proper proportion then pressure can be lower. In one aspect, pressurized air may be used in the mixing process. The containers may be pre-pressurized during packaging or pressurized by the device during the manufacturing process. Balls/spheres may result from mixing, which can be easily converted to a circular shape in the form of a cookie.

The warm fluid component can be released on to the solid components by force of gravity or mechanical aid. Alternatively, the solid components can be released onto the fluid components by force of gravity or mechanical aid. As a prelude to this combining event, one of the two compartments may be pierced, slit, torn, or punctured either by pressure or by actuating a penetrative or ripping mechanism inherent to the device. Subsequent to combining the fluid and solid components within one of the two compartments of the package or container, mechanical or pressure activated force can be used to blend all of the ingredients homogeneously. The temperature of this blend may be warmer than room temperature as a result of the heated fluid component. Optimal blending and binding can occur at the appropriate temperature and this inherently results in adhesion of all of the particles (>98% binding, i.e., less than 2% of the solid or liquid ingredients unbound). Subsequent to obtaining a homogenous sticky blend of fluid and solid ingredients, the mixture can be molded in to a desired shape, cube (square or rectangle), sphere, pyramid, or as nondescript shape as a cluster of ingredients. The mixture can be molded in to a single or multiple product units. The food product can be made into any shape. The shaping can occur due to low pressure of molding and not because of extrusion or high pressures needed to push product through a discharge die. Containers having round edges (free of linear corners) may be utilized to prevent waste. After molding, the finished product can be dried using air or other element to hasten the binding effect and reduce stickiness of the finished product.

In another example, a single compartment sac or bag can be used where the inside of the bag is pre-coated with a binding agent (approximately 5-20% of the total recipe) such as honey, brown rice syrup, maple syrup, or corn syrup and a vegetable oil (approximately 1-5% of the total recipe) such as sunflower oil or olive oil. The bag can contain the remaining ingredients of the recipe such as nuts, fruits, protein powder, flavor, etc. The ingredients can be vigorously mixed and/or blended to coat the ingredients with the binding agent and the oil, before it is put through a rolling and pressing action to let ingredients bind in to a desired shape, preferably a cylindrical type. The advantage of this process is that it obviates the need for a heating step and a multi-compartment package or container.

The binding agent can be a solid or a liquid in its stored state, however, the binding effect may be manifest only in the liquid state, mostly as a consequence of heating or pressure (heat causes a physical transformation into a slight liquid state), which can facilitate the adhesion of various solid ingredients. Therefore, the binding agent may be included in the component containing the solid set of ingredients. One recipe can be represented by a 0% liquids in the package or container, where in the recipe still includes the binding agent, but in solid state, and such a recipe can be used through the application of heat to realize a binding action on the finished product.

Subsequent to molding the product, the product can be enrobed or drizzled with a viscous liquid that hardens such as chocolate sauce or honey from a separate container with the appropriate actuation system. Alternatively, the product can be enrobed or drizzled with a desired substance outside this process and/or intended device, such as by dipping or mixing the product in milk, chocolate sauce, and/or a savory sauce. In the finished product, heat can be used to keep product warm and dry. In one aspect, a food product can comprise two or more stacked layers, which layers can be formed independently of the same or different ingredients.

As mentioned above, where two separate packages or containers containing solid and fluid ingredients are used, the process can include separate opening of the two packages, the heating of the fluid package to make liquid components flow-able in to the package consisting of the solid ingredients. Alternatively, the package having the fluid ingredients can be heated and the contents of the package having the solid ingredients can be emptied in to the package consisting of the fluid ingredients. Therefore, the molding of the snack or bar product can occur within either of the packages to remain a clean free system. In one aspect, a package can also serve as a shaping aid, in addition to storing the fluid food ingredient and/or the solid food ingredient.

Alternatively, the bar or snack can be molded in a separate compartment of the device which can receive both the solids and fluid ingredients either individually or combined. Such a compartment can be made of a non-stick material that can be easy to clean by way of steam, water, other substances, or by manual/mechanical means.

As disclosed herein, the final food product can be made using low pressure, low heat such that no cooking occurs (only mix, mold), with or without hydration in a short time. The final food product can be provided on demand and produced from pre-formulated food material stored within a package or container of fresh, ready to eat food. The final food product can be a nutritionally relevant snack or meal to meet specific dietary requirements such as need for immediate energy through carbohydrate, muscle mass and recovery through protein, specific nutritional components such as vitamins, minerals, fiber, and whole grains, or delivering specific health and lifestyle benefits including antioxidant or weight management properties. The final food product may be unavailable to consumers without significant pre-work, preparation, and manufacture in the home or other location. The final food product can therefore offer consumers a product that is highly palatable due to its freshness, softness, potential moistness, and potential warmth at consumption. A warm, moist, fresh tasting snack is currently not available in a convenient, single serve form while also providing and meeting nutritional needs.

In one aspect, the final food product can be configured as a single serve item representing the perception of a fresh snack or meal product for instant (ready to eat) or future consumption. In another aspect, the final food product can be configured to provide the perception of a home-made, fresh snack/bar for a breakfast or other meal or non-meal occasion.

The final food product can be a manufactured snack/bar or a manufactured snack/bar as it is delivered in a package or container. The final food product can be served warm or at room temperature or as cold product. The final food product can be provided in several consistencies, such as a bar-like product that ranges from brittle, hard, soft and chewy, or non-bar-like products, such as puddings, gels, emulsions, etc. In one aspect, the final food product can be further processed/flavored etc. after it is released from the device, for example, the final food product may be dipped into milk and consumed. In another aspect, the final food product can be delivered in a shape (such as a stick or other form) that is easy to dip in to a viscous substance or a liquid (such as honey, chocolate sauce, milk, etc.) and/or enrobed outside the device with a desired flavor or nutrient endowing substance. In yet another aspect, the final food product can be crumbled and consumed. In still another aspect, the final food product can be received after preparation on a pre-cut parchment paper, wax paper, or like material.

Figure 2:
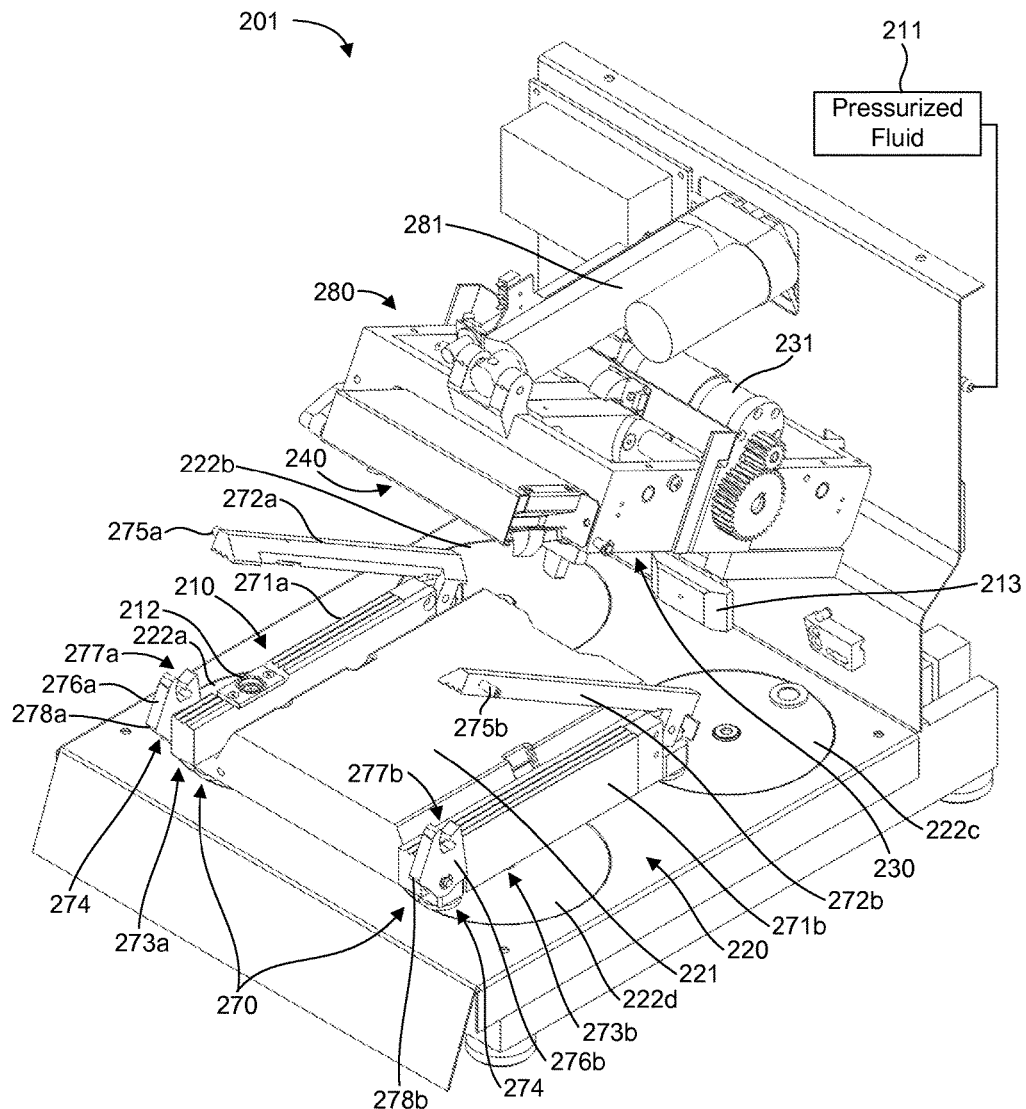
FIG. 2 is a perspective view of a food preparation device, in accordance with an example of the present disclosure.

FIG. 2 illustrates a food preparation device 201 in accordance with an example of the present disclosure. The food preparation device 201 can include a heating apparatus 240, an ingredient combining apparatus 210, a mixing apparatus 220, and a forming apparatus 230. In addition, the food preparation device 201 can include a package securing mechanism 270 to secure a package (not shown in this figure) during operation of the food preparation device.

In one aspect, the mixing apparatus 220 can comprise an orbital shaker. For example, the mixing apparatus 220 can include a package support 221 to provide support for the package while forming the food mixture. The package support 221 can be mounted to rotary members 222a-d that can be configured to guide or move the package support in an orbital motion. In one aspect, one or more rotary members can provide drive input to cause the orbital motion of the package support 221.

In one aspect, the package securing mechanism 270 can comprise a clamp configured to engage a portion of the package to hold or secure the package during the operations performed by the food preparation device 201 to prepare a food product. For example, the package securing mechanism 270 can include clamp portions 273a, 273b configured to engage opposite sides of the package when the package is disposed on the package support 221. Each clamp portion 273a, 273b can include a lower clamp jaw 271a, 271b and an upper clamp jaw 272a, 272b. Thus, the package securing mechanism 270 can secure the package on the mixing apparatus 220.

A locking mechanism 274 can also be included to facilitate locking the lower clamp jaws 271a, 271b and the upper clamp jaws 272a, 272b to maintain the package in a secured configuration during operation of the device 201. For example, the locking mechanism 274 can include a pin 275a, 275b extending from the upper clamp jaws 272a, 272b, and a receiving member 276a, 276b pivotally coupled to the lower clamp jaws 271a, 271b, respectively. The receiving member 276a, 276b can have an opening 277a, 277b configured to receive the pin 275a, 275b and secure the pin by mechanical interference upon pivoting of the receiving member. The receiving member 276a, 276b can be configured to pivot into a locking position under force from the pin 275a, 275b. A release feature 278a, 278b can extend from the receiving member 276a, 276b to facilitate pivoting the receiving member to a release position to release the pin 275a, 275b from the opening 277a, 277b. The release feature 278a, 278b can be interface with a door or lid (not shown in this figure) to release the locking mechanism 274 upon opening the door or lid by a user of the device 201.

In one aspect, the ingredient combining apparatus 210 can comprise a pressurized fluid source 211 fluidly coupleable to the package to provide pressurized fluid, such as gas (heated or otherwise), to break a frangible seal. This gas could be filtered and/or purified to prevent ingredient contamination using HEPA filters, ultraviolet light, etc. In the illustrated embodiment, such a fluid coupling can be made by way of the package securing mechanism 270. For example, the lower clamp jaw 271a can include a fluid port 212 configured to interface with the package to fluidly couple the pressurized fluid source 211 and the package. In addition, a fluid coupler 213 can be configured to engage and interface with a portion of the package support 221 to provide a fluid connection with the package support 221 and the fluid port 212. As explained in more detail below, the rotary members 222a-d can position the package support 221 proximate the fluid coupler 213 to facilitate a fluid connection with the pressurized fluid source 211.

The heating apparatus 240 and the forming apparatus 230 can be mounted on a pivoting arm 280 that is actuatable by an actuator 281 to extend and retract the heating apparatus 240 and the forming apparatus 230 at appropriate stages of operation of the food preparation device 201, which are described in more detail below. An actuator or motor 231 can provide force and/or torque to operate the forming apparatus 230.

Figure 3A:
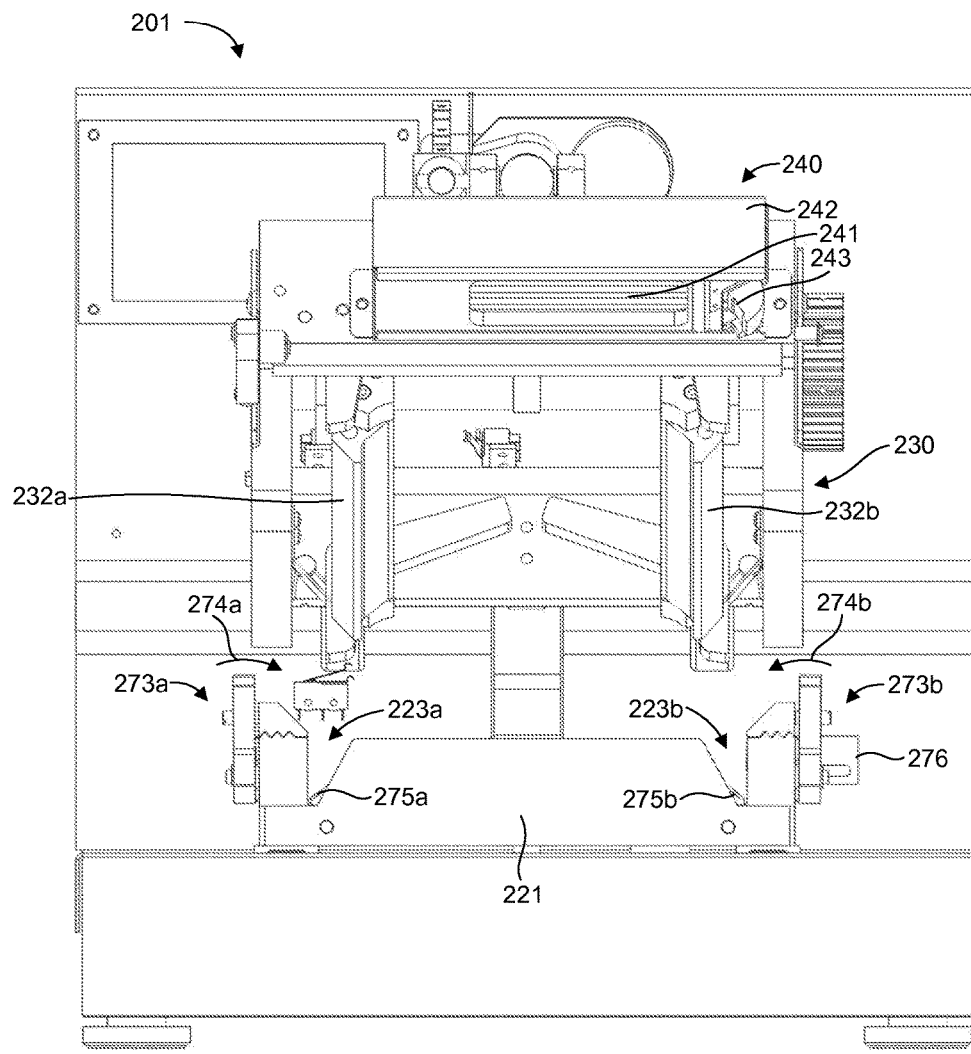
FIGS. 3A and 3B are front views of the food preparation device of FIG. 2.
Figure 3B:
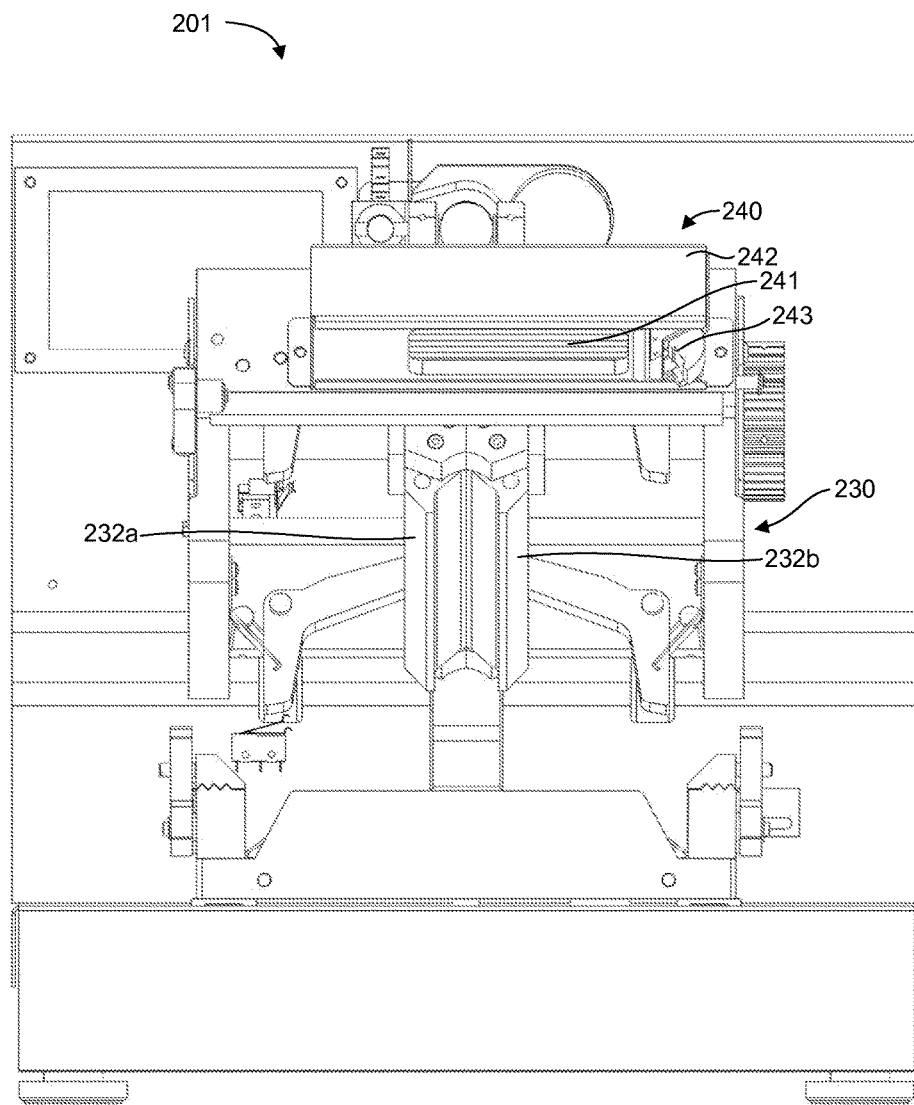

With continued reference to FIG. 2, FIGS. 3A and 3B are front views of the food preparation device 201, showing certain features of the device that are hidden from the view of FIG. 2. For example, the forming apparatus 230 can include a die to form the food mixture into the predetermined shape. In one aspect, the die can comprise two dies 232a, 232b movable relative to one another to form the food mixture into the predetermined shape. FIG. 3A shows the dies 232a, 232b separated from one another, which may represent a starting position for the dies when first engaging the food mixture to form a predetermined shape. FIG. 3B shows the dies 232a, 232b proximate one another, which may represent a finishing position for the dies when the predetermined shape has been formed. The dies 232a, 232b can apply any suitable pressure that may be desired to form a final shape of a food product. Typically, a pressure of from about 2 psi to about 25 psi will be applied to form the food mixture into the final shape, although pressures outside this range may be applied. In a particular example, the pressure applied by the dies 232a, 232b can be about 11 psi. The applied pressure can vary depending on the recipe.

The heating apparatus 240 can include a heating element 241, which can be disposed in a shroud 242 that can be configured as a heat shield and may be at least partially insulated to protect other components of the device 201 from heat. The heating apparatus 240 can be configured to generate heat in any suitable manner. In one aspect the heating apparatus 240 can comprise a resistance heater, a convection heater, a radiant heater, or a combination thereof. In a particular aspect, the heating apparatus 240 can comprise a nichrome heater. A sensor 243 can be included to determine whether the fluid and/or solid food ingredient and/or the package have been heated sufficiently. Any suitable sensor may be utilized for sensing and/or measuring heat or thermal characteristics, such as a thermopile sensor, an infrared sensor, etc.

In one aspect, the clamp portions 273a, 373b can be pivotally coupled to the package support 221 to facilitate inflation and deflation of the package 202. In other words, the clamp portions 273a, 373b can be movable to accommodate inflation of the package by pressurized fluid. For example, the clamp portions 273a, 373b can be rotatable inward in direction 274a, 274b to accommodate a decrease in a lateral dimension of the package as the package increases in thickness, due to inflation of the package by the pressurized fluid source 211. The package support 221 can be configured to facilitate such rotational movement of the clamp portions 272a, 273b by providing a gap 223a, 223b into which the clamp portions can move. Springs 275a, 275b can bias the clamp portions outward, opposite direction 274a, 274b. A minimum inflated thickness or "pillowing" of the package may facilitate successful mixing of the fluid and solid ingredients. A sensor can be used to determine whether the package has been sufficiently inflated. For example, a sensor can be used to determine internal pressure of the package or an outer dimension of the package to ensure that the package has achieved a minimum amount of pillowing or inflation. In one aspect, the movement of the clamp portions 273a, 273b can be related to a sufficient amount of inflation of the package. In this case, a sensor 276 (e.g., an IR sensor) can be used to determine whether the clamp portions 273a, 273b have moved inwardly in direction 274a, 274b to an extent that indicates that the package has been adequately inflated. In addition, movement of the clamp portions 273a, 273b can facilitate determining whether the frangible seal in the package has been broken. It should be recognized that the food preparation device 201 can include any suitable type of sensor in any suitable quantity to facilitate operation of the device as described herein. Such sensors can include position sensors, pressure sensors, force sensors, accelerometers, thermal sensors, optical sensors, or any other suitable type of sensor.

Figure 4:
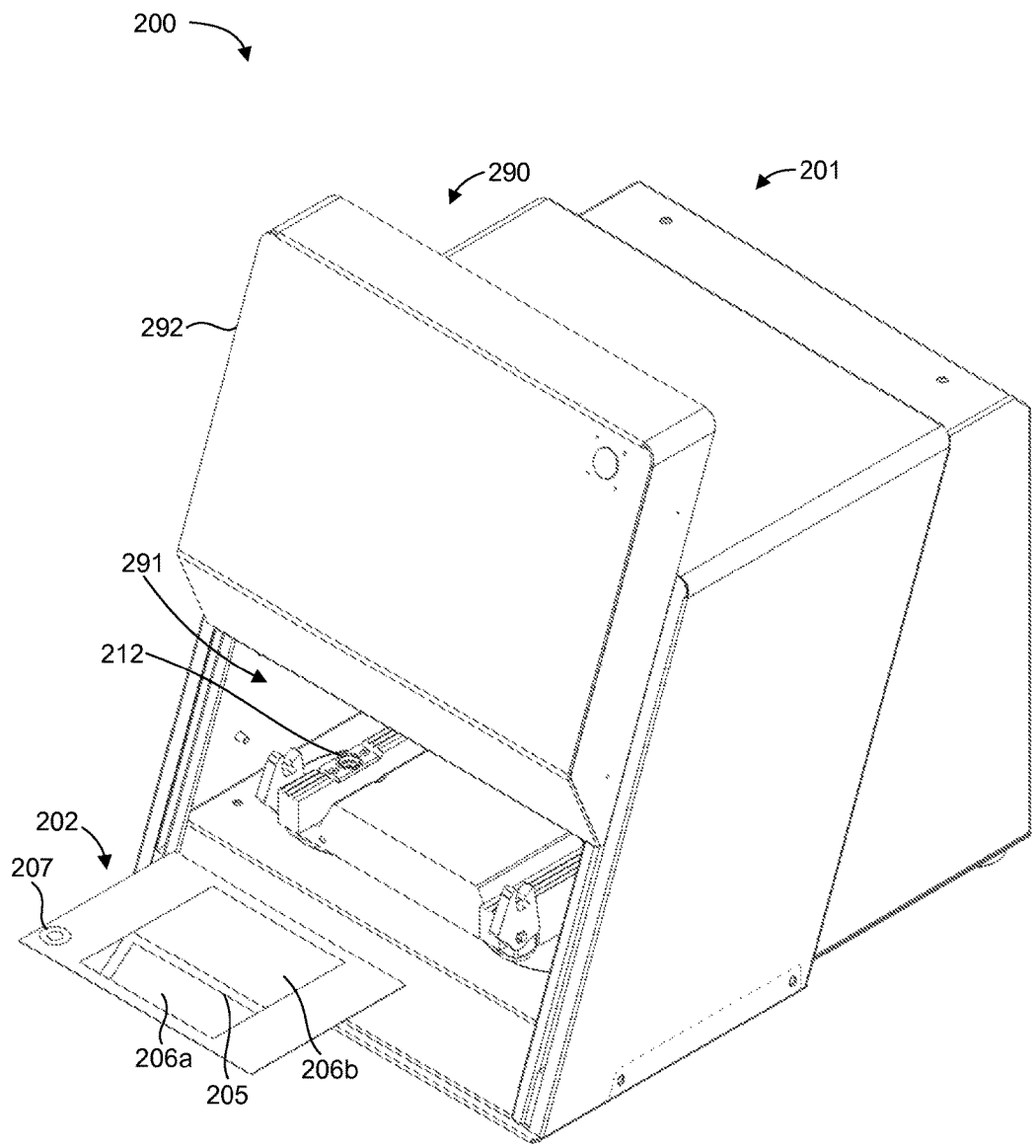
FIG. 4 is a perspective view of a food preparation system, in accordance with another example of the present disclosure.

FIG. 4 illustrates a food preparation system 200 in accordance with an example of the present disclosure. The system 200 can include the food preparation device 201 described above. In this case, the device 201 is shown with a housing 290 disposed about the various components of the device previously described, such as the ingredient combining apparatus, the mixing apparatus, and the forming apparatus. A receptacle 291 can be defined within the housing 290 to receive a package 202. The package 202 can include compartments 206a, 206b that can contain a fluid food ingredient and a solid food ingredient, respectively. The compartments 206a, 206b can be separated at least in part by a frangible seal 205. When the package 202 is in the receptacle 291, any of the various components of the food preparation device 201 may be operable on the package. The housing can also include a lid or door 292 for the receptacle 291. In one aspect, operation of the food preparation device 201 can be initiated by closing the lid 292 when the package 202 is disposed in the receptacle 291. In another aspect, a start button can be pushed to initiate operation of the device 201. From that point, the rest of the process can be automatically controlled via microprocessor. The process can also be started with an integral timer. The user can load the package 202 into the device 201 and set the desired start time.

Different food formulations, different serving sizes, and different extrusion dies all may require different cooking times, temperatures, and pressures. The package 202 may be affixed with one of a plurality of possible "sensory" devices which will indicate to a "reader" installed in the food preparation device 201 the desired cooking regimen, i.e., each individual package may have an attached bar code containing process parameters (mix time, mixing speed, pressure, temperature, etc.) unique to the intended finished food product. The code can be read by the device's control system at the beginning of the process, as more fully described herein below.

There are a variety of possible sensory devices that may be used. Possibilities include but are not limited to various barcodes, magnetic strips, conductive or resistive elements, resonant devices, physical features (e.g., bumps or depressions in the container, and RFID chips). It is also apparent that the cost of such features may preclude their use in which case it may fall to the user of the appliance to select a cooking procedure using a keypad or other type of user input device.

The devices disclosed herein may be designed and sized as a home or commercial appliance for conveniently producing single and/or multiple servings of nutritious, freshly made food products for humans or pets. Packages containing food ingredients can be provided with ingredients formulated in accordance with a variety of recipes.

Figure 5:
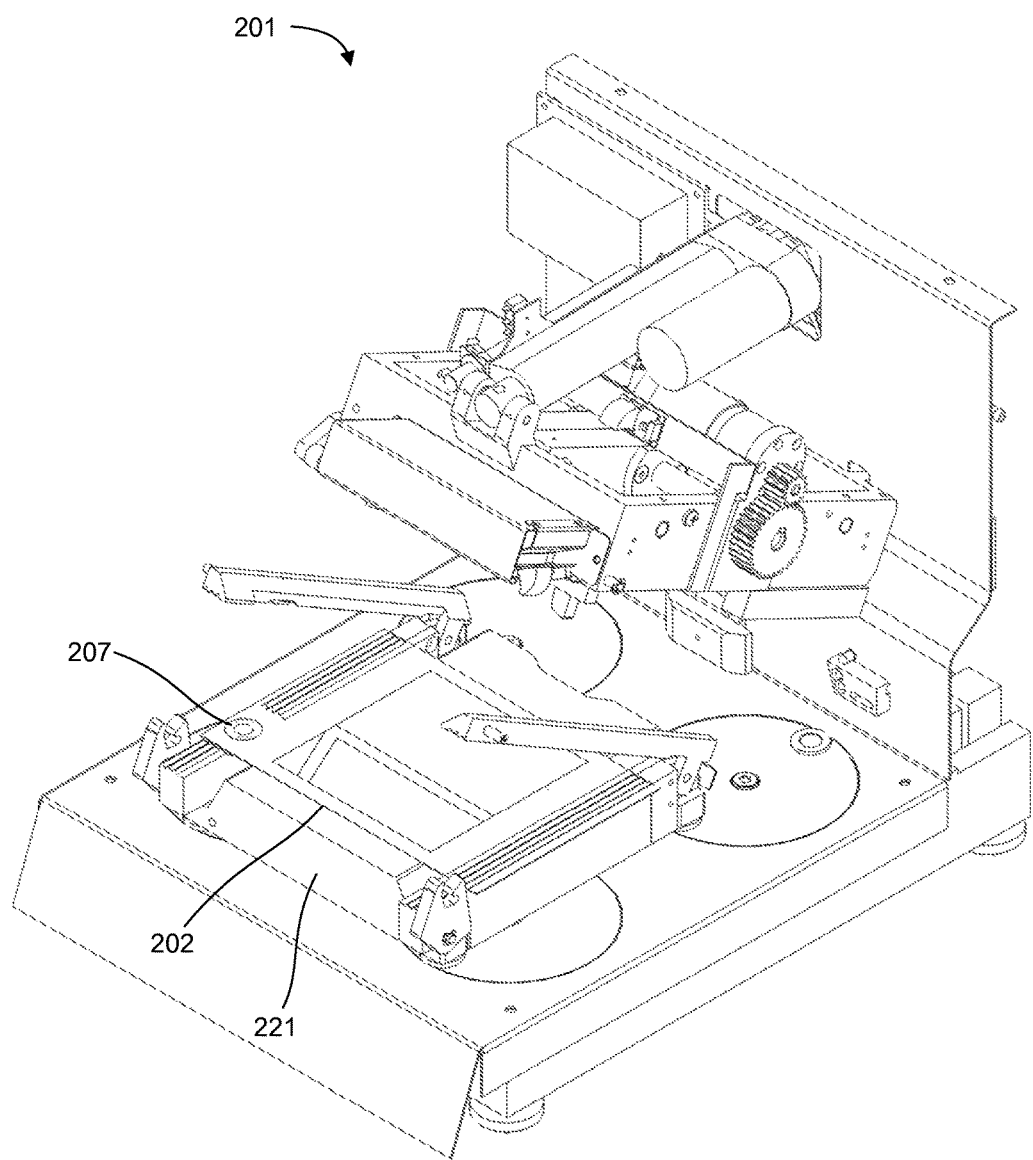
FIG. 5 is a perspective view of the food preparation device of FIG. 2 with a package on a package support in a forward position prior to operation.
Figure 6:
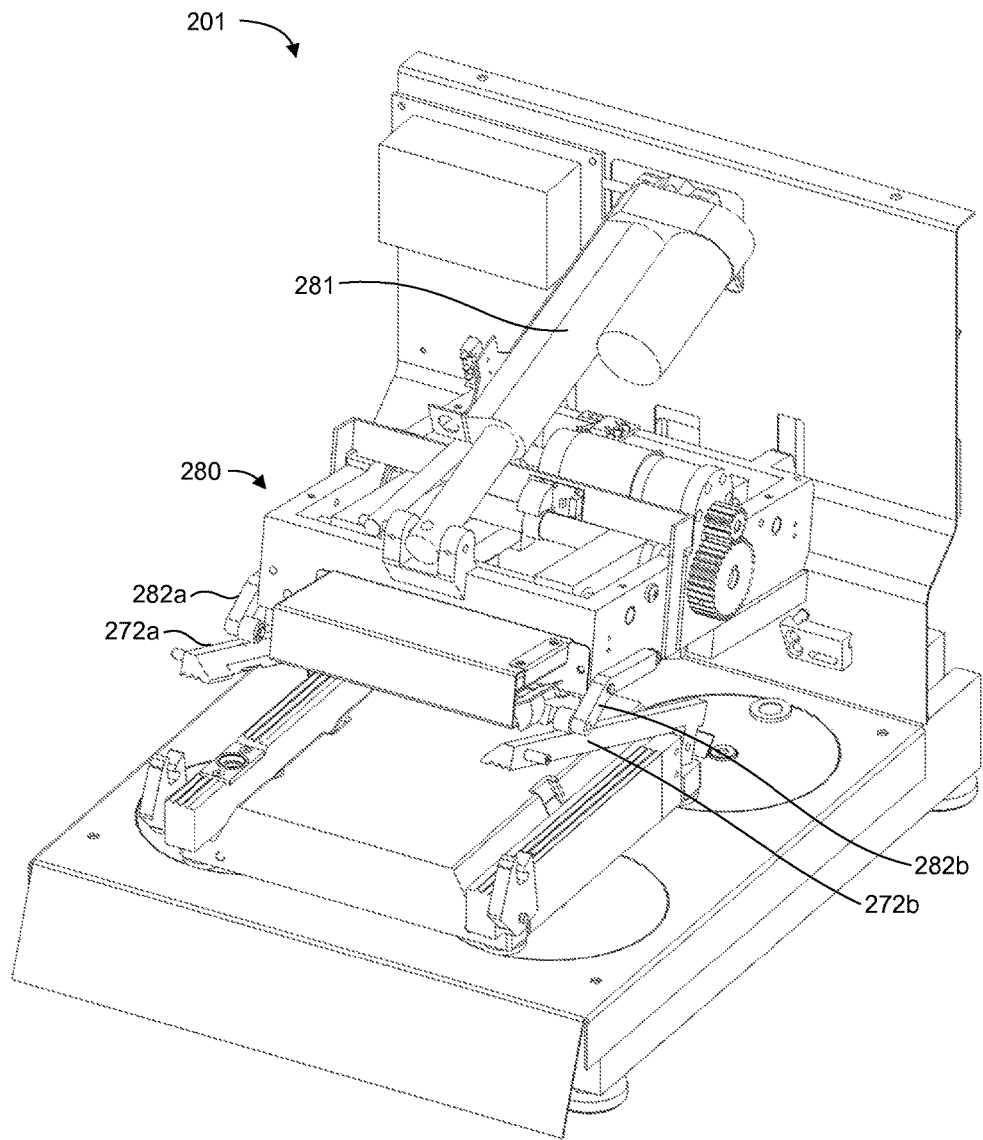
FIG. 6 is a perspective view of the food preparation device of FIG. 2 illustrating operation of the device to secure a package.
Figure 7:
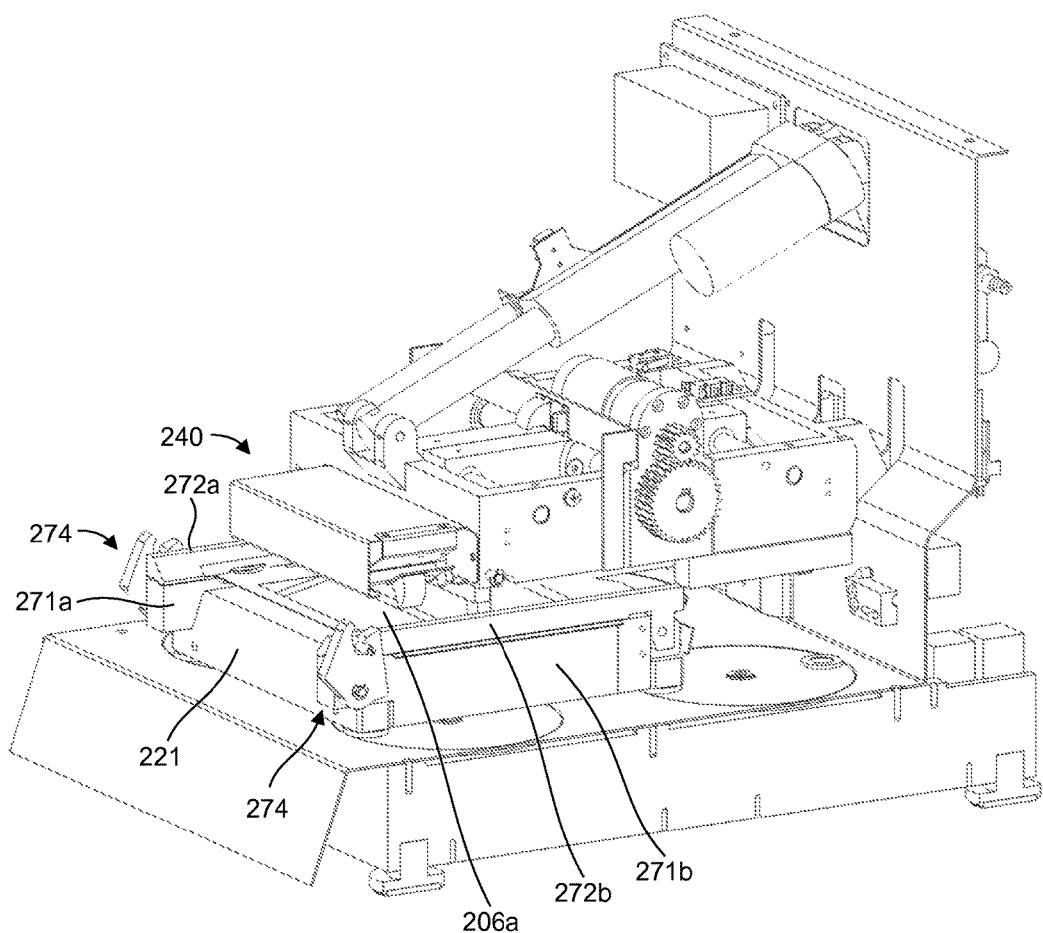
FIG. 7 is a perspective view of the food preparation device of FIG. 2 illustrating a heating operation of the device.
Figure 8:
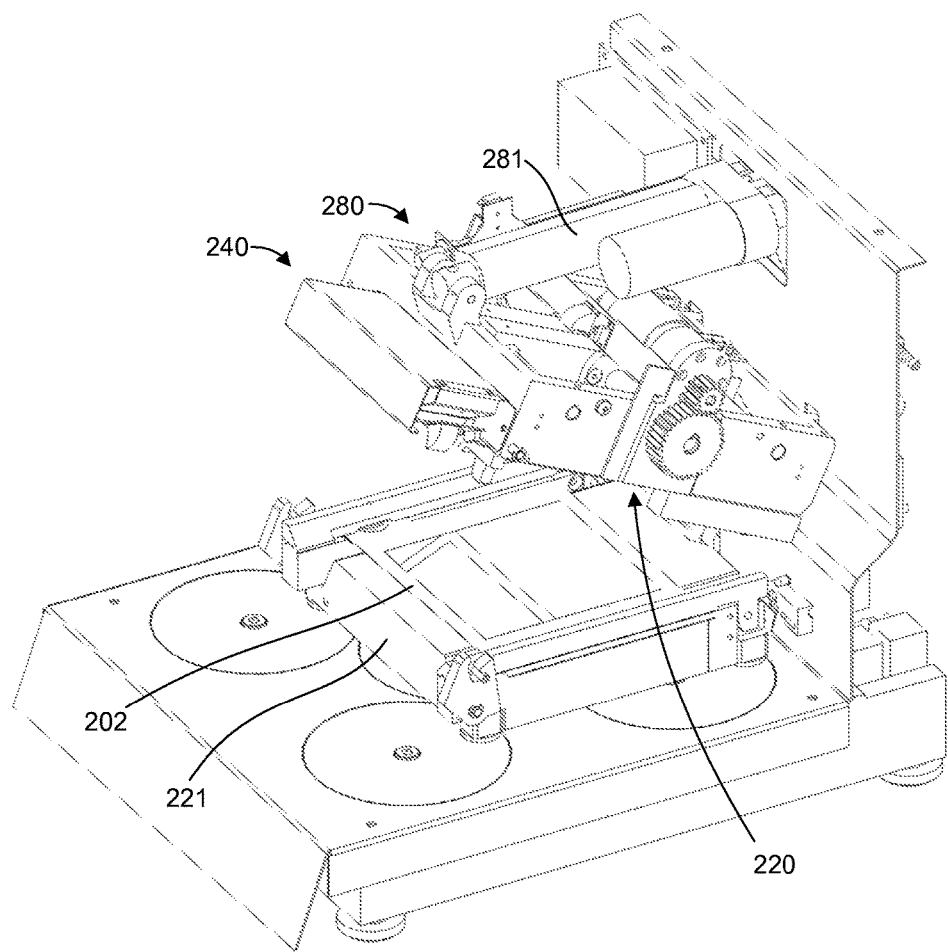
FIG. 8 is a perspective view of the food preparation device of FIG. 2 illustrating a rearward position of a package support.

FIGS. 4-14 will be referred to in order to describe the use or operation of the food preparation device 201. For example, in use, the package 202 can be disposed in the receptacle 291 such that an inlet port 207 of the package is disposed on or proximate to the fluid port 212. This configuration of the package 202 and the food preparation device 201 is shown in FIG. 5, in which the housing 290 has been removed for clarity. At this point, the user can close the lid or door 292, which can initiate or allow operation of the device 201. The package support 221 can be positioned forward toward the lid or door of the device 201, which can facilitate access to the package support by the user for placement and retrieval of the package 202. Once the package has been appropriately placed on the package support 221, the actuator 281 can cause the arm 280 to move downward such that extension members 282a, 282b contact the upper clamp jaws 272a, 272b, as shown in FIG. 6 (the package 202 has been omitted). The actuator 281 continues to move downward until the upper clamp jaws 272a, 272b and the lower clamp jaws 271a, 271b are locked to one another by the locking mechanism 274, thus securing the package 202 on the package support 221, as shown in FIG. 7. In the configuration shown in FIG. 7, the heating apparatus 240 is located above the compartment 206a that contains the fluid food ingredient. The heating apparatus 240 can therefore heat the fluid food ingredient to a desired temperature or temperature range, as described herein. For example, the heating apparatus can heat the fluid food ingredient to a temperature of about 80 degrees C. Heating may take place for any suitable length of time. Typically, heating will occur for about 2 second up to about 60 seconds. In a particular example, heating may occur for up to about 45 seconds. Once the fluid food ingredient has been sufficiently heated, the actuator 281 can raise the arm 280 to retract the heating apparatus 240 and the mixing apparatus 220 and provide clearance for the package support 221 and package 202 to move to a rearward position, as shown in FIG. 8.

Figure 9A:
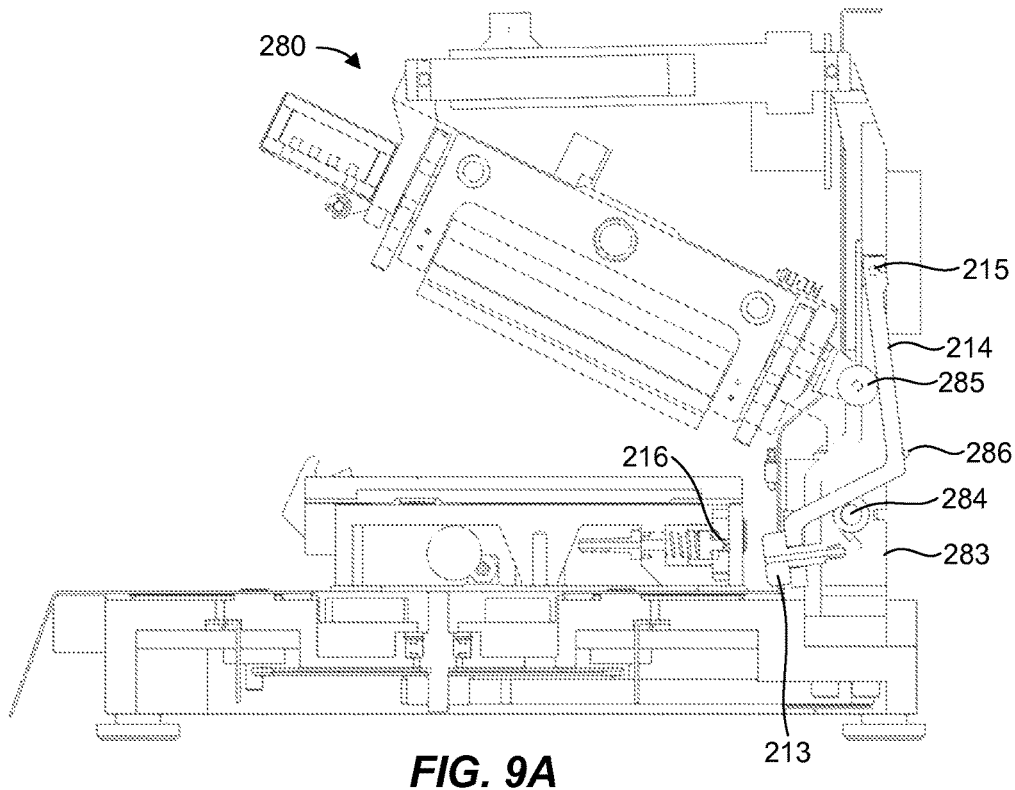
FIG. 9A is a side cross-sectional view of the food preparation device of FIG. 2 illustrating a rearward position of a package support and a fluid coupler disengaged from the package support.
Figure 9B:
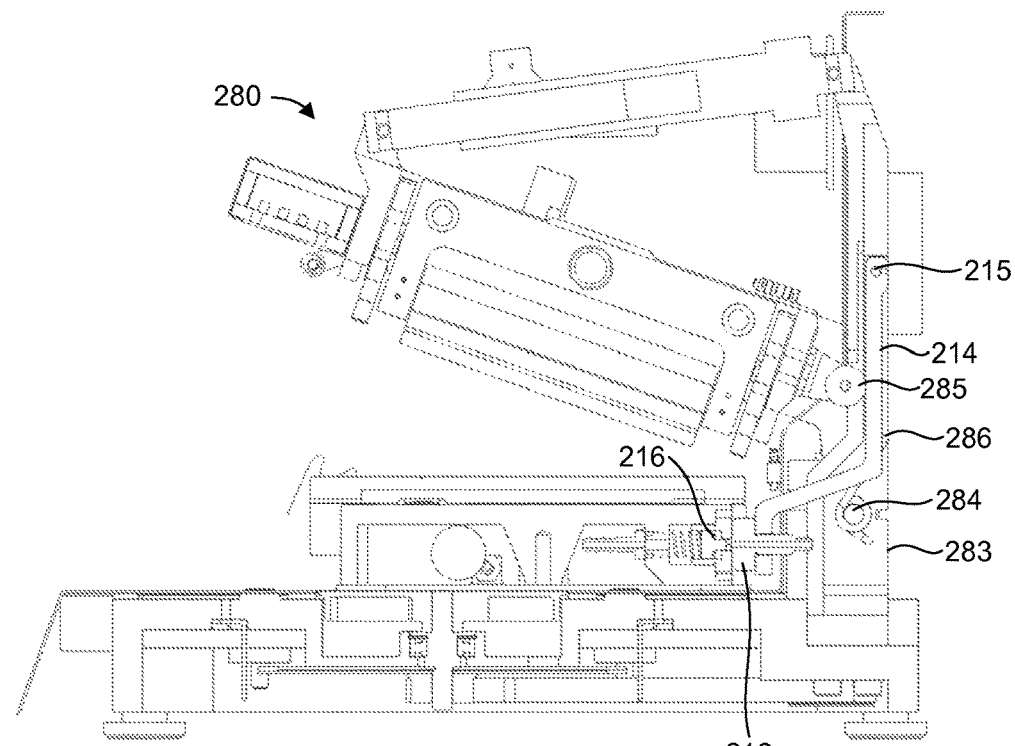
FIG. 9B is a side cross-sectional view of the food preparation device of FIG. 2 illustrating a rearward position of a package support and the fluid coupler engaged with the package support.

As shown in FIGS. 9A and 9B, the elevated position of the arm 280 can be configured to cause refraction of the fluid coupler 213 (FIG. 9A) or extension of the fluid coupler 213 (FIG. 9B). For example, the fluid coupler 213 can be carried by a pivot arm 214 pivotally coupled at pivot 215 to a rear support member 283. The arm 280 can also be pivotally coupled to the rear support member 283 at pivot 284. A spring 286 can bias the pivot arm 214 forward such that the fluid coupler 213 extends forward to contact a valve 216 on the package support 221. An extension member 285, which can include a roller, can extend from a back of the arm 280 to contact the pivot arm 214 when the arm 280 is sufficiently elevated. Thus, when the package support 221 is to be moved, such as for positioning the package or for mixing, the arm 280 can be elevated sufficient to cause the fluid coupler 213 to be moved rearward and clear of unwanted inference, as shown in FIG. 9A. On the other hand, when the package is to be coupled to the pressurized fluid source or fluid is to be removed from the package, the package support 221 can be moved to the rearward position, and the arm 280 can be lowered sufficient to allow the fluid coupler 213 to move forward and engage the valve 216, as shown in FIG. 9B. The arm 280 may still be elevated sufficient to provide clearance for the package, which may be inflated. Alternatively, the fluid coupler 213 can be moved by an actuator (not shown).

Figure 10:
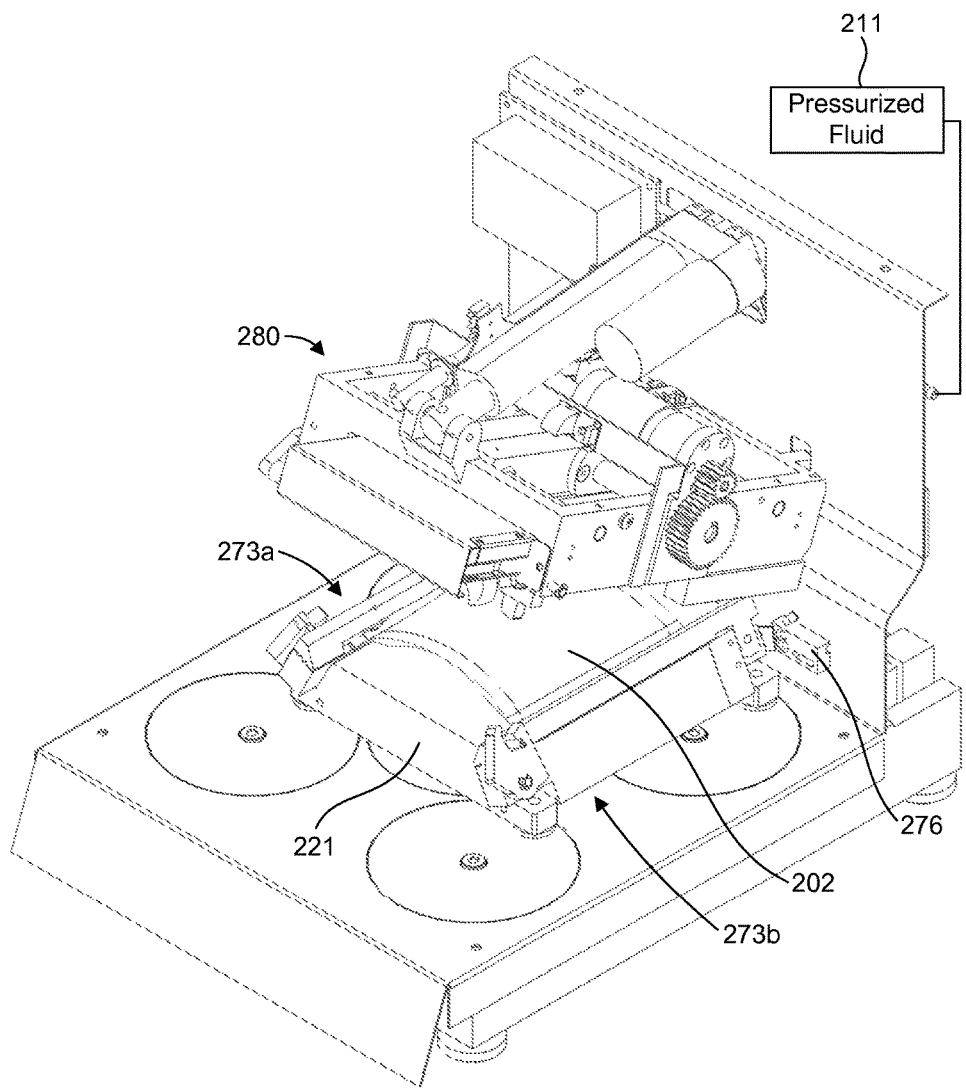
FIG. 10 is a perspective view of the food preparation device of FIG. 2 illustrating inflation of the package.
Figure 11:
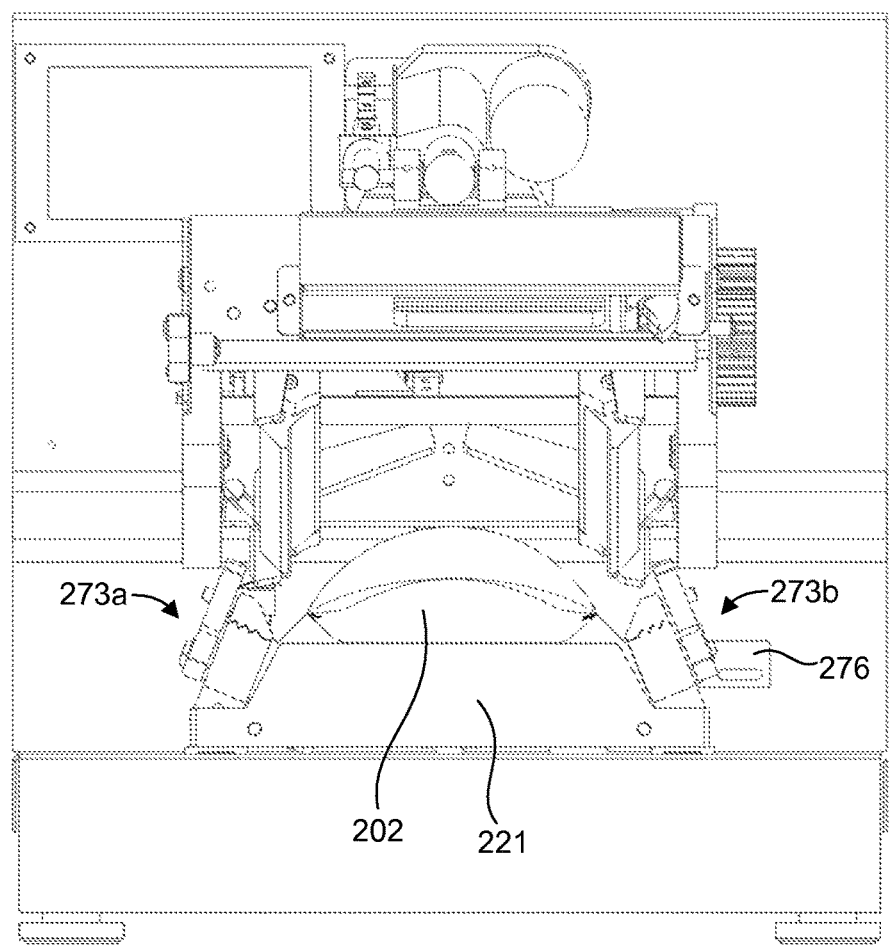
FIG. 11 is a front view of the food preparation device of FIG. 2 illustrating inflation of the package.

FIGS. 10 and 11 illustrate inflation of the package 202, such as when the package support 221 and the arm 280 are in the position shown in FIG. 9B. In this configuration, pressurized fluid is introduced to the package, which can break the frangible seal between compartments, thereby introducing the fluid food ingredient to the solid food ingredient. As mentioned above, the clamp portions 273a, 273b can rotate inwardly due to the inflation of the package 202. When sufficient movement of the clamp portions 273a, 273b has been detected by the sensor 276 indicating that the package 202 has been adequately inflated to facilitate proper mixing of the fluid and solid food ingredients, the supply of pressurized fluid from the pressurized fluid source 211 can be terminated. At this point, the arm 280 can elevate provide the configuration shown in FIG. 9A, such that the fluid coupler 213 is retracted from the package support 221 and clearance is provided for operation of the mixing apparatus.

Figure 12:
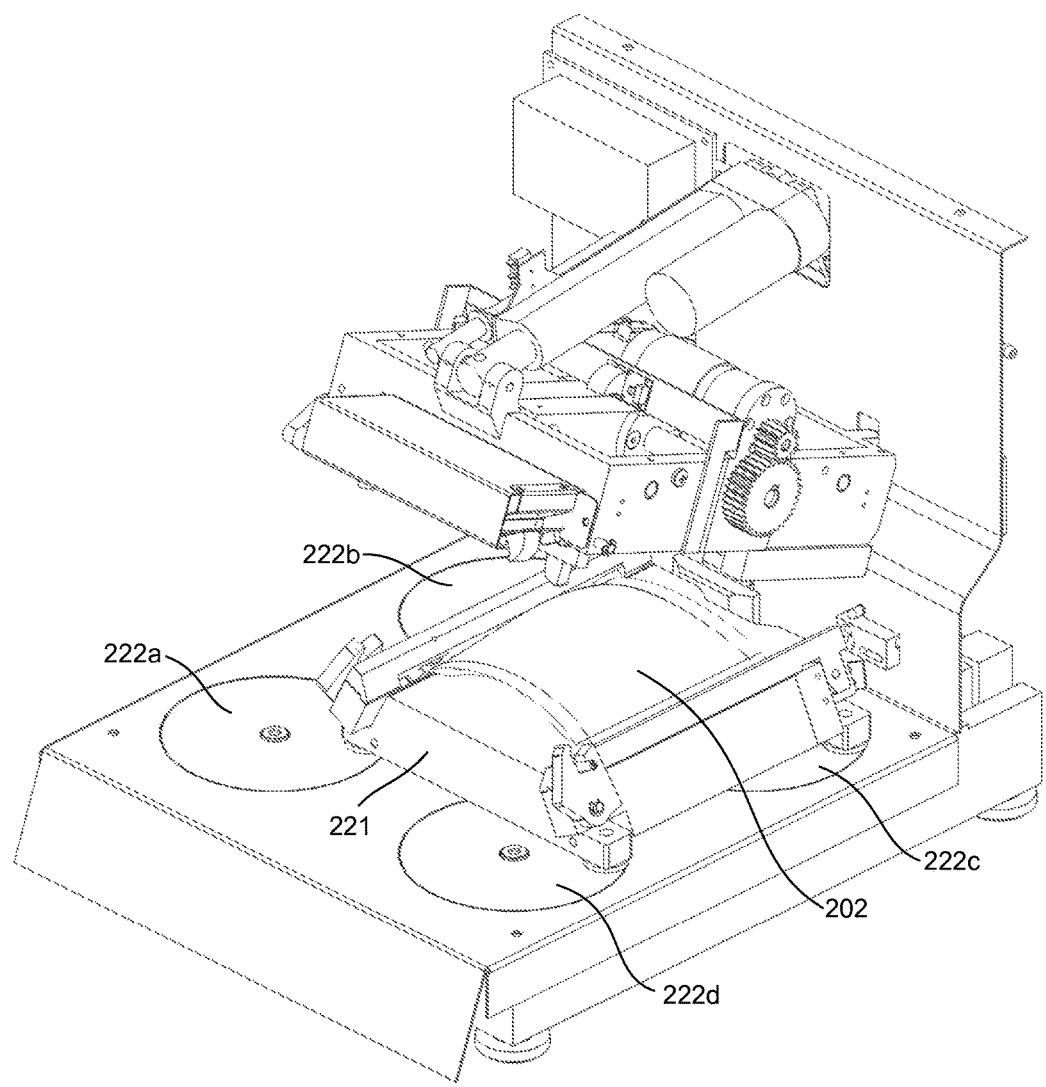
FIG. 12 is a perspective view of the food preparation device of FIG. 2 illustrating a mixing operation.
Figure 13:
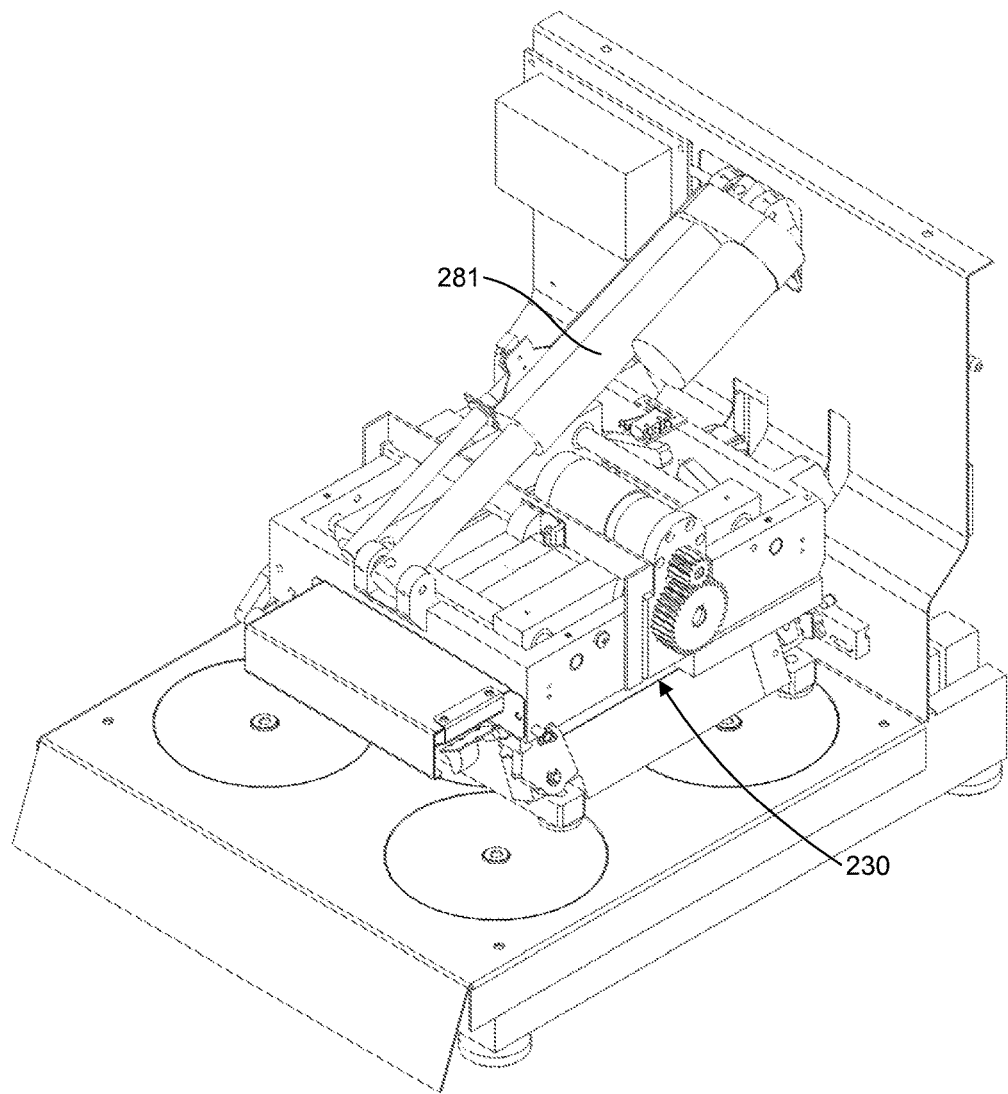
FIG. 13 is a perspective view of the food preparation device of FIG. 2 illustrating a forming operation.

As shown in FIG. 12, the rotary members 222a-d can guide or move the package support 221 in an orbital motion to mix the fluid and solid food ingredients into a food mixture within the package 202. Orbital motion of the package support 221 can be at any suitable speed. In one aspect, orbital motion of the package support 221 is at 350 RPM. Mixing may take place for any suitable length of time, which may vary depending on the recipe. Typically, mixing will occur for at least 45 seconds and less than about 3 minutes, although mixing times outside of this range are possible.

Figure 14:
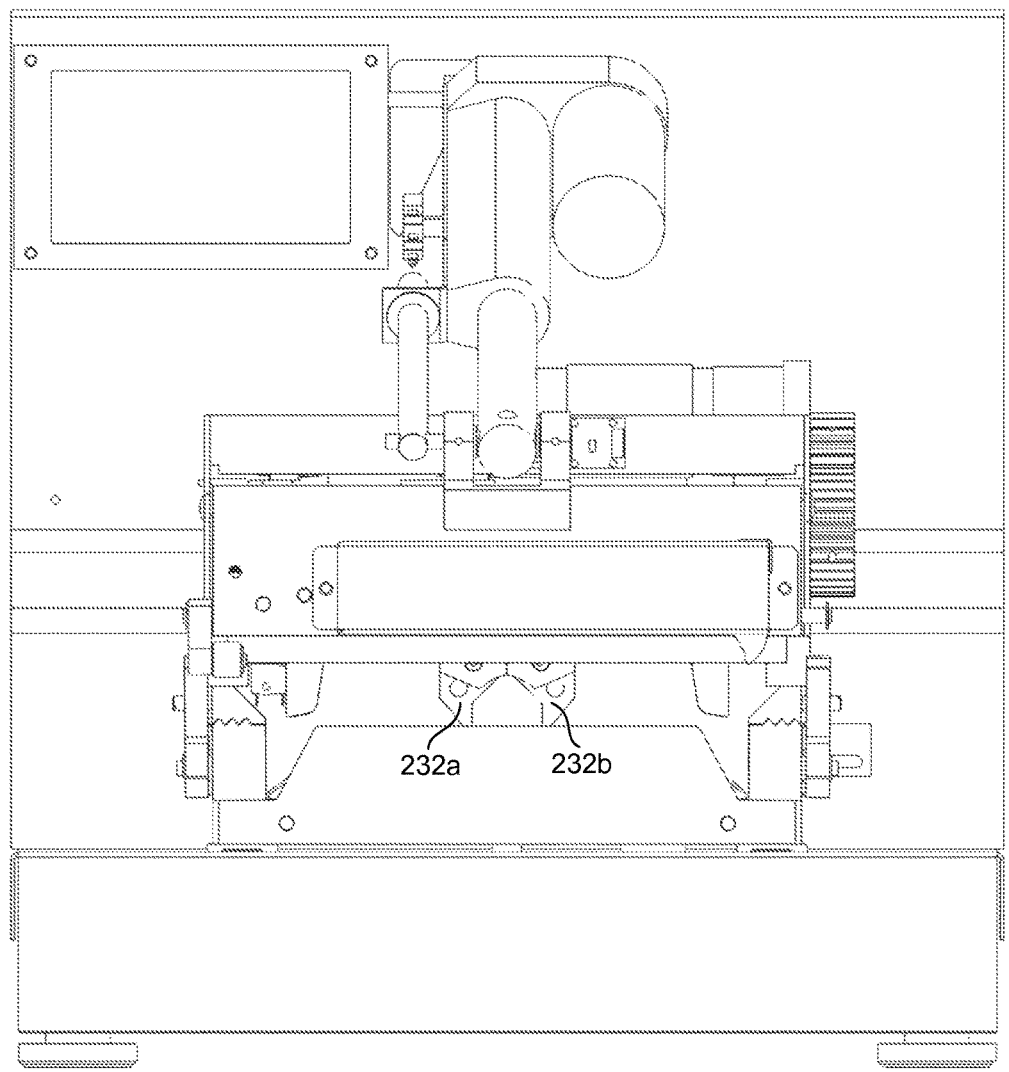
FIG. 14 is a front view of the food preparation device of FIG. 2 illustrating a forming operation.

When mixing is done, the package support 221 is moved to the rearward position where the arm 280 is lowered to an intermediate position, as shown in FIG. 9B, such that the fluid coupler 213 engages the valve 216. In this configuration, fluid (typically gas) can be removed from the package to facilitate shaping or forming the food mixture into a desired final shape while inside the package. Once a sufficient amount of fluid has been removed from the package, the forming apparatus 230 is lowered by actuation of the actuator 281 to the configuration shown in FIG. 13. FIG. 14 shows a final position of the dies 232a, 232b. The package has been omitted for clarity. The dies 232a, 232b move inward to shape the food product. The dies 232a, 232b operate external to the package to form the food mixture into a desired shape within the package. The dies 232a, 232b can move inward to facilitate forming the final shape of the food product any suitable number of times. In one aspect, the dies 232a, 232b move inward only a single time to form the final shape of the food product.

When a final shape is achieved, the arm 280 can elevate to the configuration shown in FIG. 9A. The package support 221 can then move to a forward position, where the locking mechanism 274 can be released, such as by action of the user opening the door or lid 292. Optionally, the locking mechanism 274 can be released by an actuator. The upper clamp jaws 272a, 272b can be biased upward by a spring to facilitate removal of the package from the device 201 by the user. The user can then retrieve the package with a finished food product inside. The package can then serve as a wrapper for the food product, which can temporarily protect the food product and from which the food product can be consumed.

Figure 15:
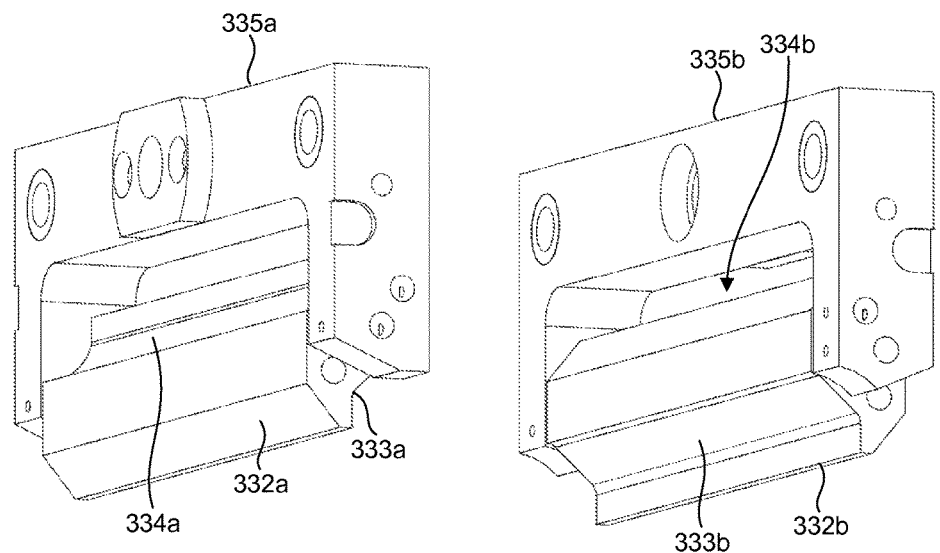
FIG. 15 is a perspective view of shaping dies of a food preparation device that can be configured to form a plurality of predetermined shapes, in accordance with an example of the present disclosure.

FIG. 15 illustrates dies 332a, 332b that can be configured to form a plurality of predetermined shapes. For example, die portions 333a, 333b can be configured to form one shape and die portions 334a, 334b can be configured to form another shape. The dies 332a, 332b can be rotatably coupled to die supports 335a, 335b. Thus, a different shape can be achieved by rotating the dies 332a, 332b to expose a desired die portion to the operating position. Although two predetermined shapes are represented in the figure, it should be recognized that any suitable number of predetermined shapes can be formed by rotatable dies as shown and described.

Figure 16:
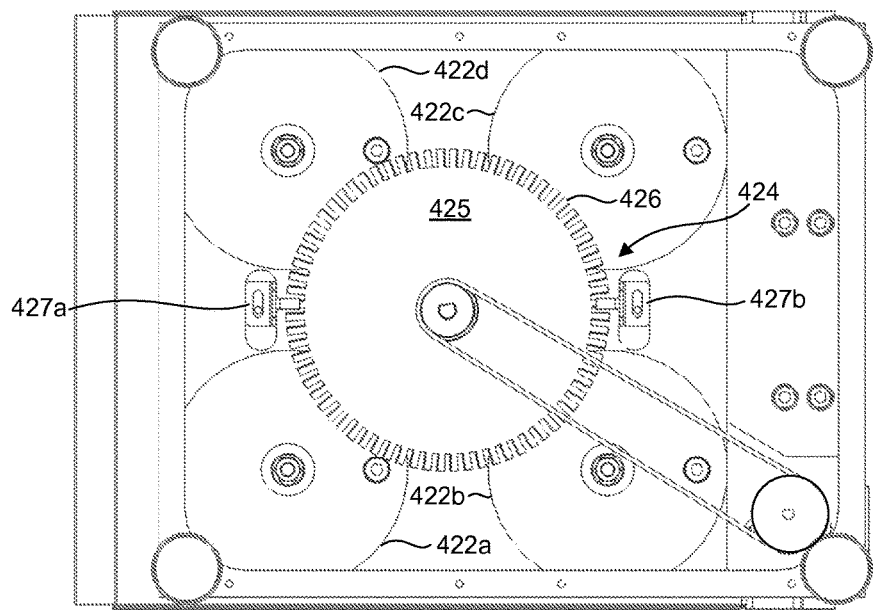
FIG. 16 is a bottom view of a mixing apparatus of a food preparation device, in accordance with an example of the present disclosure.

FIG. 16 illustrates a bottom view of a mixing apparatus 420. In this case, a drive rotary member (hidden from view) can be coupled to a motor to provide drive torque for an orbital mixer. Guide rotary members 422a-d can be passive and can serve to guide the movement of a package support. The drive rotary member can be coupled to a positioning device 424, which can have a disc 425 with a plurality of tabs 426 that can be sensed by sensors 427a, 427b. The positioning device 424 can be used to determine a position of the package support and facilitate proper positioning of the package support for the various operations of a food preparation device as disclosed herein.

Figure 17:
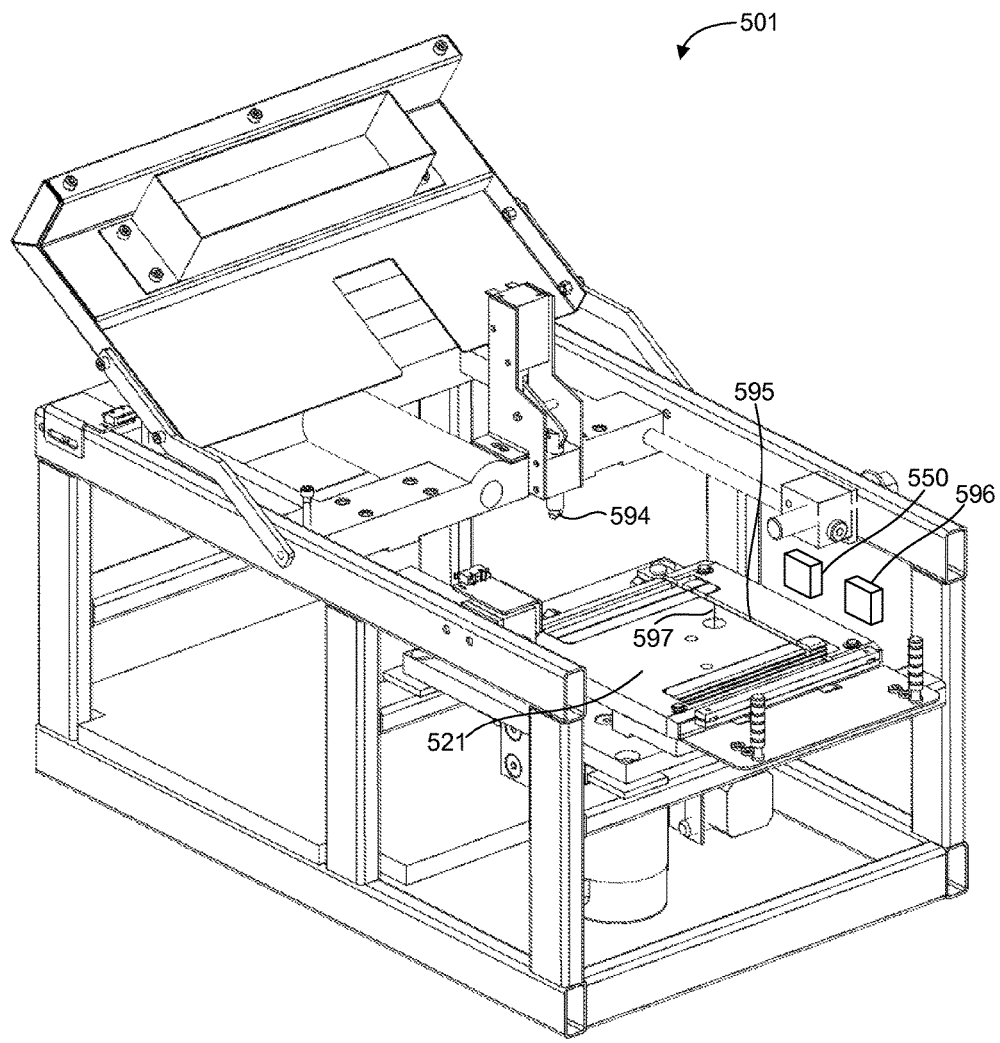
FIG. 17 is a perspective view of a food preparation device, in accordance with another example of the present disclosure.
Figure 18A:
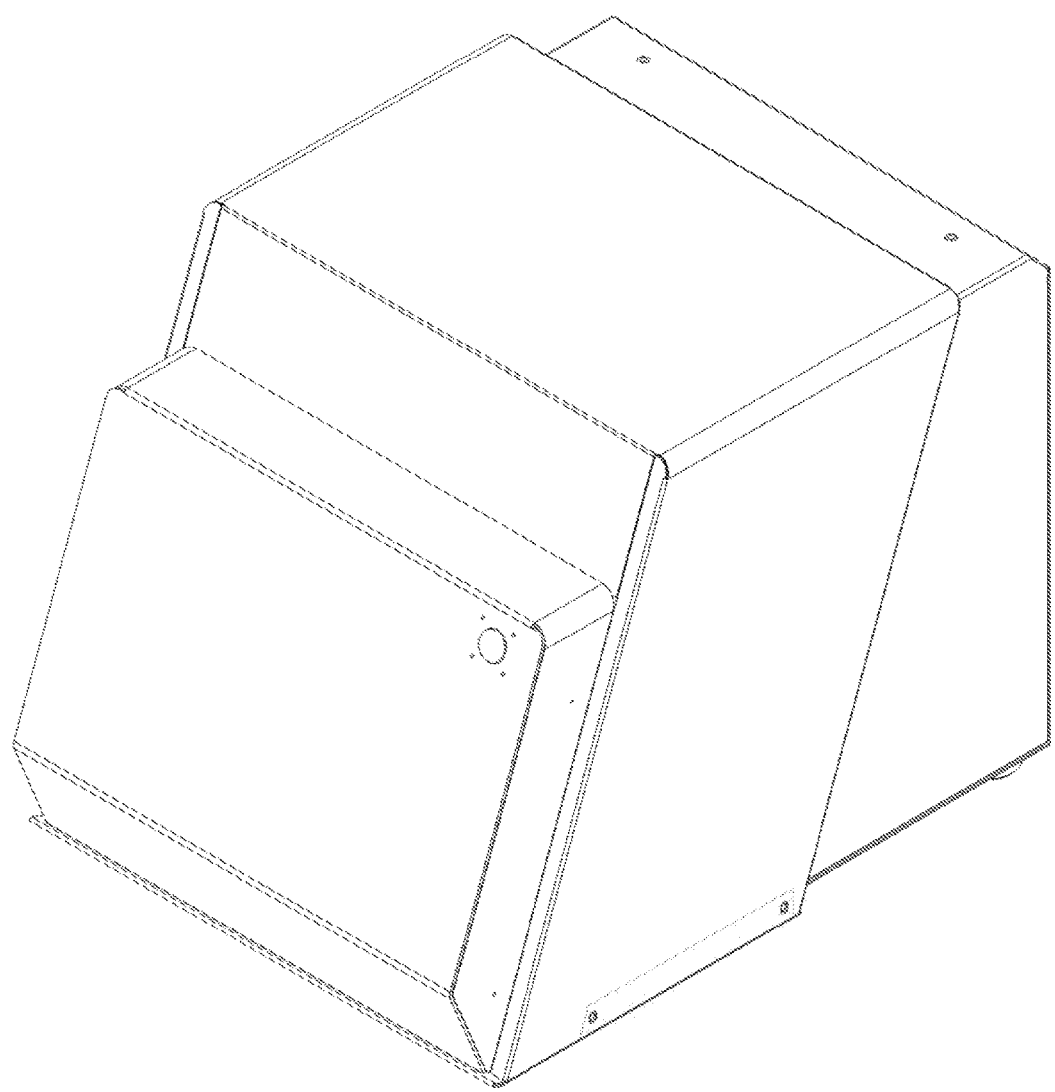
FIG. 18A is a perspective view of a food preparation device, in accordance with yet another example of the present disclosure.
Figure 18B:
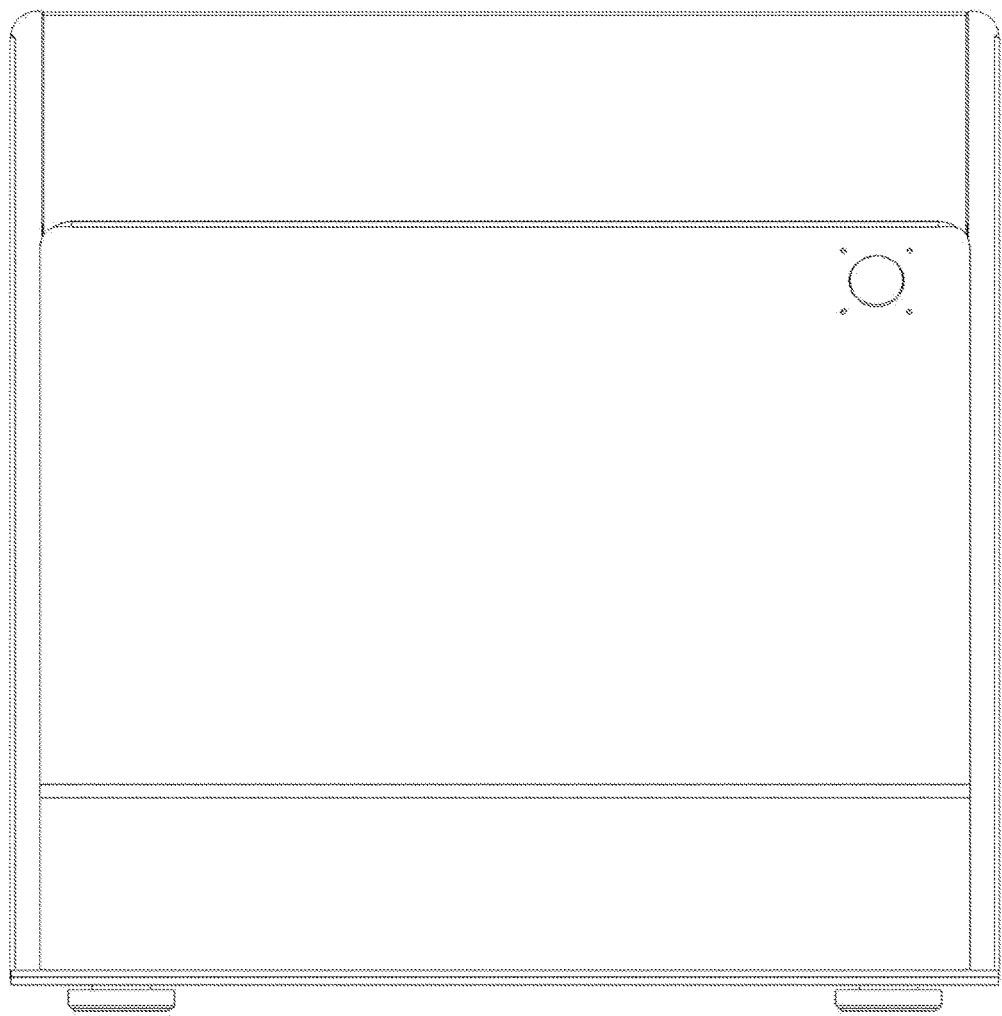
FIG. 18B is a front view of the food preparation device of FIG. 18A.
Figure 18C:
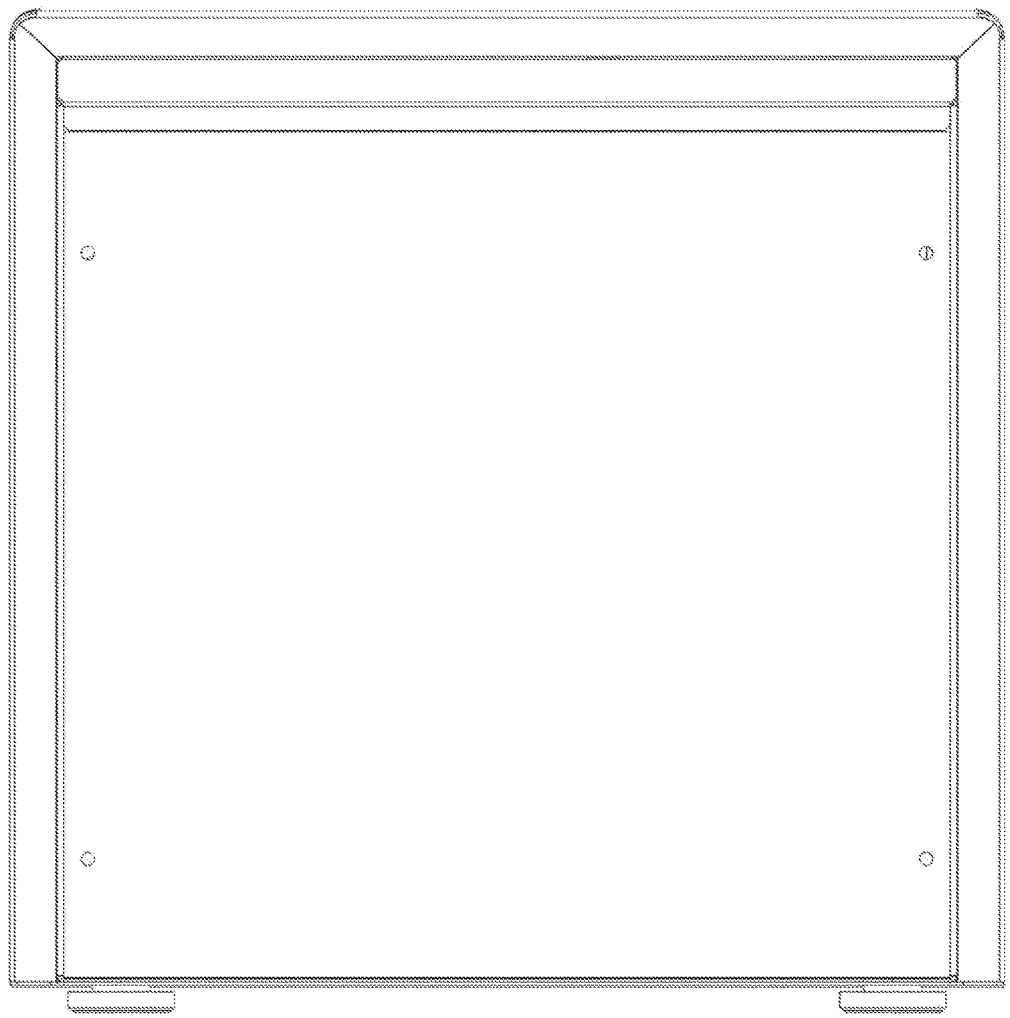
FIG. 18C is a rear view of the food preparation device of FIG. 18A.
Figure 18D:
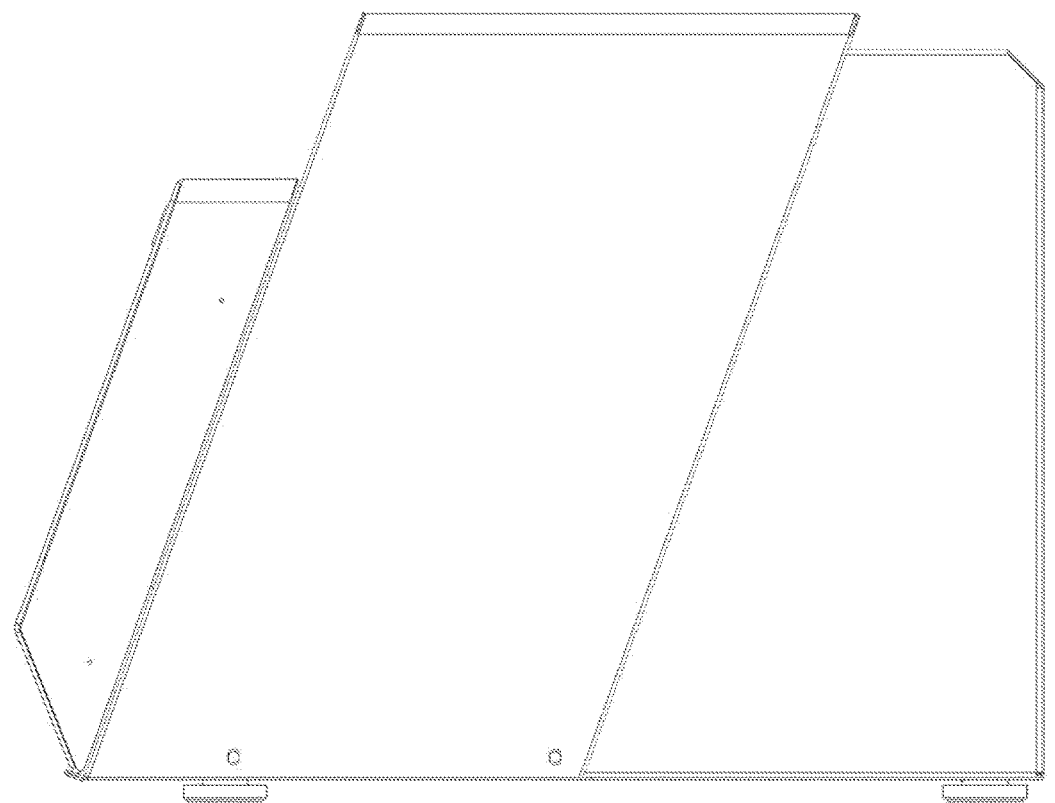
FIG. 18D is a side view of the food preparation device of FIG. 18A.
Figure 18E:
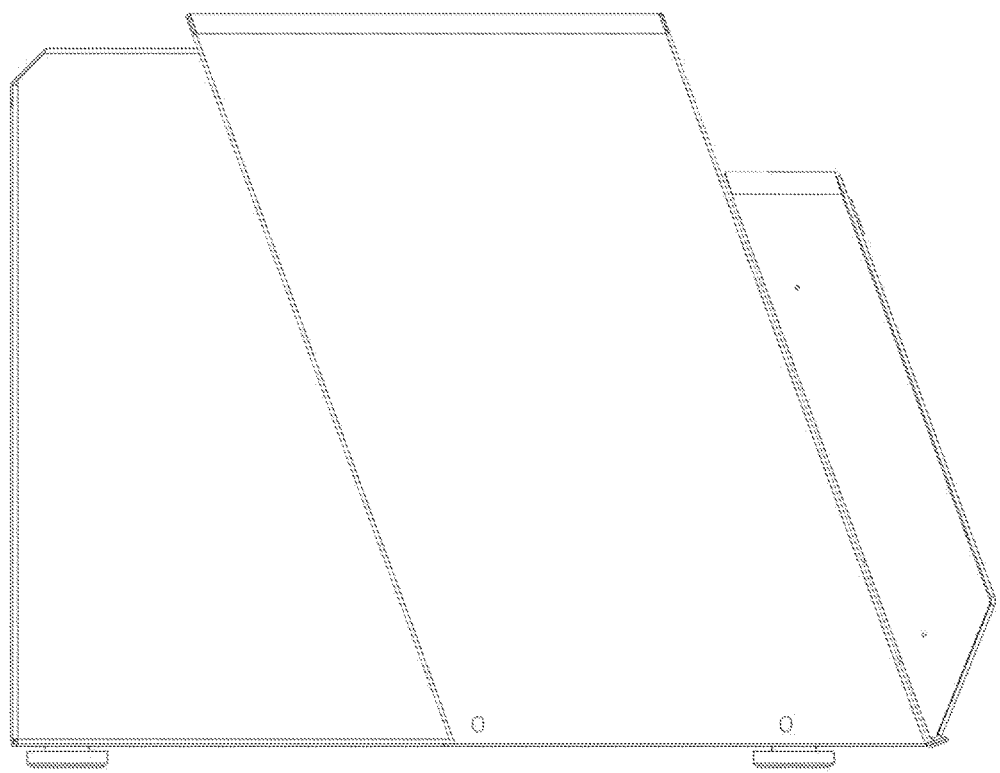
FIG. 18E is a side view of the food preparation device of FIG. 18A.
Figure 18F:
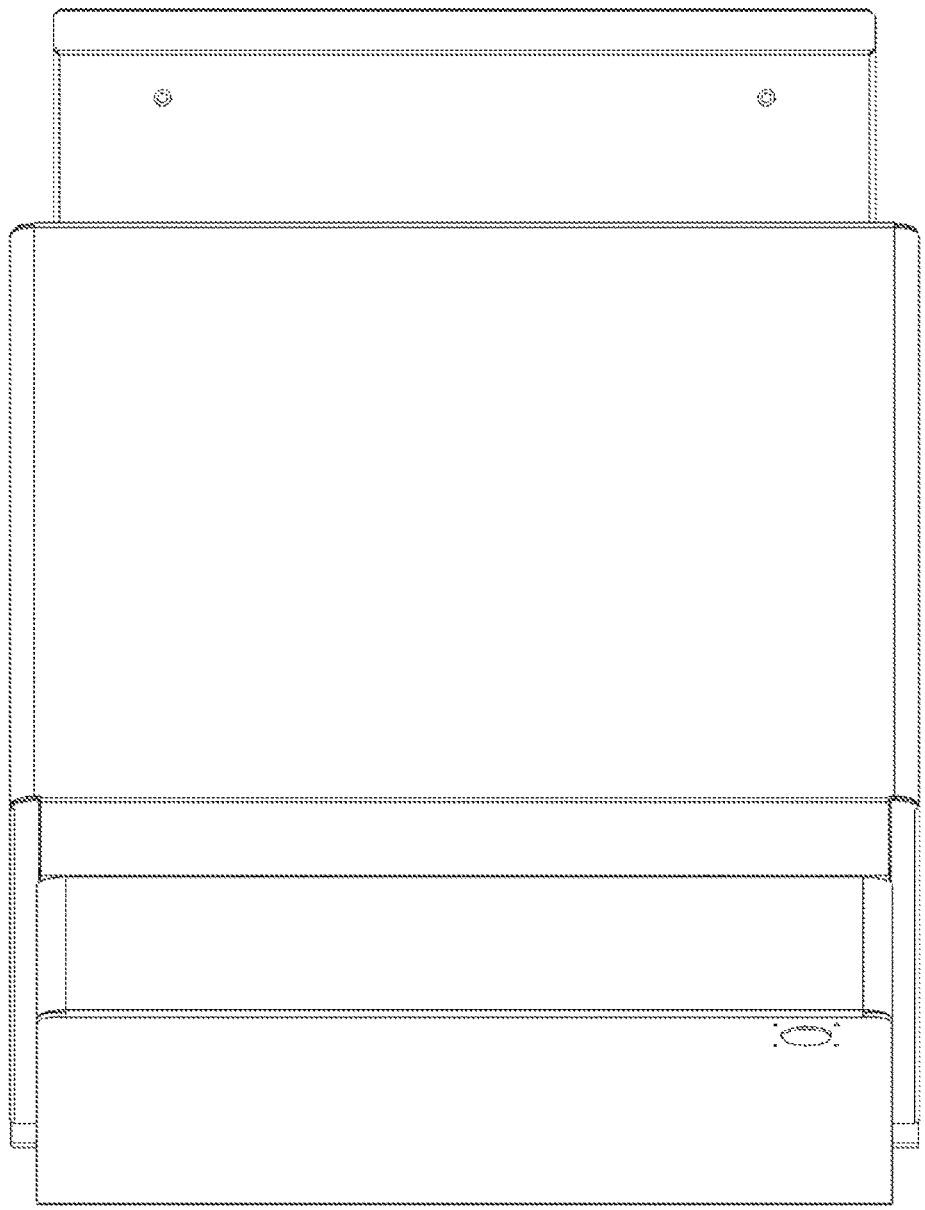
FIG. 18F is a top view of the food preparation device of FIG. 18A.
Figure 18G:
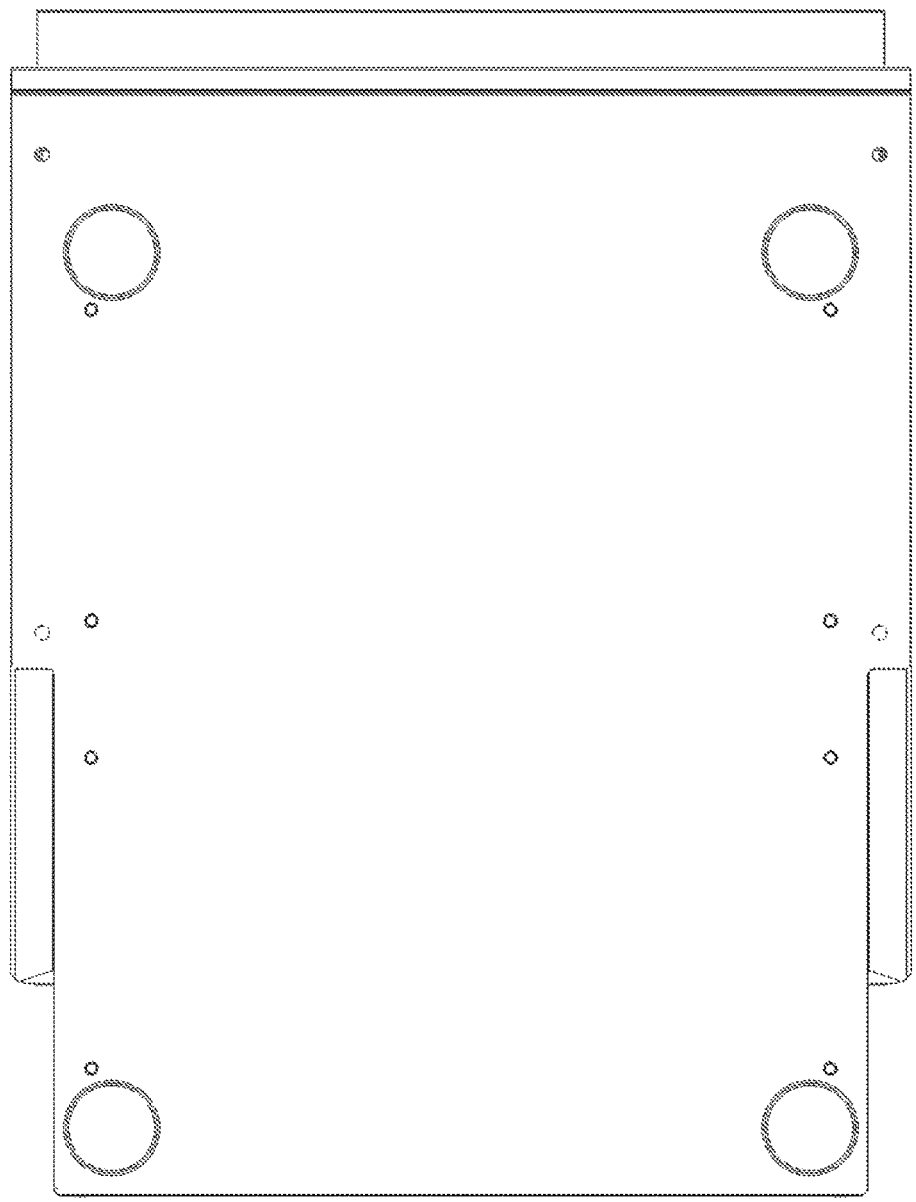
FIG. 18G is a bottom view of the food preparation device of FIG. 18A.

FIG. 17 illustrates a food preparation device 501 in accordance with another example of the present disclosure. In this case, the device 501 includes a drying apparatus 550 to remove moisture from a food mixture (e.g., a final food product) within a package. In addition, the device 501 include a package opening apparatus 594 to create an opening in the package to facilitate the removal of moisture from the food mixture by the drying apparatus 550. The package opening apparatus 594 can comprise a cutter, such as a knife or blade. A package support 521 can include a recess 595, such as a channel or groove to provide clearance for the cutter when creating the opening in the package. The drying apparatus 550 can be positioned proximate the opening to direct air into the opening of the package. The drying apparatus 550 can include a blower to provide air at ambient temperature and, optionally, a heater, to provide hot air, and/or cooling system to provide cold air or cryogenic air.

In one aspect, the device 501 can include a sealer 596 to seal an opening created by the package opening apparatus 594. Thus, an excess of package material can be removed by the package opening apparatus 594, such as an empty compartment or other portion of the package that does not contain the final food product, and the sealer can form a seal around the final food product. The package can therefore be reduced in sized and formed into a relatively compact wrapper for the food product, which can then be saved for later consumption.

The device 501 also illustrates a needle 597 that can be used to introduce fluid (e.g., gas heated or otherwise) to the package and/or remove fluid from the package. The needle 597 can be actuated to move upward into the package through a hole or opening in the package support 521.

FIGS. 18A-18G illustrate several views of an exterior design of a food preparation device in accordance with an example of the present disclosure.

Recipes presented herein may represent snack or meal formulations having a pre-mixed blend of ingredients. The formulations have a single set of all ingredients or can be divided into multiple sets of ingredients. One of these sets includes the solid and/or partially dry ingredients, while another set of ingredients includes the fluid or partially liquid/viscous materials in the recipe. In one aspect, another set of ingredients includes the highly powdered components. Alternatively, the sets of ingredients can be distinguished based on requirement for heating. For example, some of the ingredients may be too viscous and need to be heated sufficiently for flow-ability, homogeneous mixing, and improved functionality, such as ingredient binding. In one aspect, some of the ingredients may be used to elicit an adhesive effect on the remaining ingredients. In another aspect, some of the ingredients may be used to release the finished product with ease from the package, bag, or container which was used to mix, bind, and mold the ingredients.

Recipe 1: (Cereal or Granola Based Products)

Dry component can include cereals like rolled oats or granola clusters, and a liquid binding agent (honey, Brown Rice Syrup (BRS), and or any other sweetening syrup).

Cereal or granola (60-90%), binding agent (10-40%) (single or a combination of varying amounts of multiple binding agents) Ex: honey (5-30%) BRS (5-30%), Oil (0.5-4%).

Cereal or granola (up to 60%), binding agent (up to 40%) (Single or a combination of varying amounts of multiple binding agents), example: honey (18%) BRS (18%)), Oil (up to 4%).

A simpler version of the above recipe: Granola/rolled oats (80%), honey/BRS (19%), Oil (1%) can make a drier and less sticky product.

Butter, nut butters such as almond or coconut butter for example were used in the recipe at levels ranging between 2-20% for adhesion and easy release of the product.

The dry components can have a water activity of <0.65 and the fluid components can have a water activity of <0.65 to endow shelf stability and quality extension in their pre-product state.

Flavors, colors, other minor ingredients can also be included for specific taste and visual appeal.

Notes:

Excessively high levels of cereal or granola can result in poor adhesion, become too dry, and crumble too easily and difficult to mold.

Excessively high levels of binding agent can result in undesirable stickiness of the finished product and inability to release the product.

Excessively high levels of oil can result in undesirable stickiness and greasiness.

Recipe 2: (Products Containing Large Amounts of Fruits and Nuts).

Includes nuts (chopped or whole) (single nut type or varying combinations of cashews, almonds, peanuts, walnuts), dried fruits (dates, cranberries, cherries), and a binding agent (honey, BRS) and a few drops of oil (safflower oil).

Nuts (30-60%), dried fruits (30-60%), binding agent (1-5%) but ideally consisted of nuts (48%), dried fruits (48%), binding agent (4%).

Fruits can possess sufficient adhesion properties but nuts are too dry. To ensure adhesion, nuts and even fruits can be pre-coated with a small amount of binding agent prior to packaging.

Ingredients can help with the adhesion process during product manufacture, improved shelf life, and taste quality.

Nuts and/or fruits may also be pre-coated with a small amount of the oil component(s) prior to filling other ingredients to help with ease of mixing and efficiency.

Nuts in particular can be pre-coated with glycerin (and can be with other binding agent) prior to packaging them to help with binding during the preparation process.

Notes:

Excessively large particulate sizes of cereal, granola or nuts may result in poor adhesion, become too dry and crumble too easily.

A powdered binding agent, such as cane sugar, that liquefies on application of mild amounts of heat can be used.

In either of the recipes types (1 and 2) above, the ingredients, particularly the solid components can be consumed in their raw state without prior processing.

Recipe 3 (Products Containing High Levels of Powder Such as Protein Powder, Fiber Powder, and Sweetener):

This recipe includes a powdered ingredient representing proteins such as those derived from dairy, plants, microbes, and animals (sweet or acid whey powder, whey protein concentrate, whey protein isolate, milk protein isolate, milk protein concentrate, sodium or potassium caseinate, skim milk powder, cream powder, soy protein isolate, soy protein concentrate, wheat protein, canola protein, pea protein, algal protein etc.), fibers such as chicory root, inulin, and sweeteners such as cane sugar, corn syrup, and natural and artificial high intensity sweeteners.

The content of powdered protein (of a single type or a combination of several types), for example, can be in the range of 15-50% of the recipe and used along with nuts such as chopped almonds, peanuts, walnuts, pecans, etc. (in the range of 5-15%). The binding of protein and nuts can be facilitated by viscous liquid sweetening agents such as honey, brown rice syrup, agave nectar, etc. (used in the range of 25-45%). Mild heating of these liquid agents prior to addition to the proteins and nuts can enhance uniformity of application and binding action. A small amount of an oil component used in the range of 2-6% can help to release the finished product with ease from the package, bag, or container which was used to mix, bind, and mold protein and nuts.

The particle size of nuts in a high protein product as described above can be similar to that used in a lower protein (fruit/cereal) type bar (but can be larger as well).

Fluidity of the liquid component used for sweetening and more particularly for binding can contribute to a more uniform high protein product. Such fluidity can be attained by ensuring sufficient heat is applied to this component, but a controlled amount such that the fluid component does not necessarily come to boil. For example, a blend of honey, brown rice syrup and oil in the ratio of 35:35:30 at room temperature (70° F.) can correspond to a viscosity of >5000 cps (5000-25000 cps) and the same blend when heated to >120° F. (between 10-15 seconds in a microwave at high heat setting based on a mass range of 15-20 g of the blend) can correspond to a viscosity of <5000 cps (500-5000 cps). A time of microwave heating greater than 15 seconds can result in boiling of this blend.

Particle size of nuts and dried fruits can influence the amount of liquid oil needed to obtain a balance between moistness for binding (adhesion between ingredients) and release (lack of adhesion to container) and product dryness to prevent stickiness. The combination of this balance with the right amount of heat and mechanical pressure can result in a product of desired physical characteristics not limited to homogeneity, shape, thickness, and overall size. The other fluid ingredients may play a role in determining the binding action but may not contribute significantly to the release of finished product (separation from container/pouch/package).

Ultimately, the choice of specific ingredients determined the microbial safety of the packaged ingredients, and general shelf life of ingredients, palatability of the combination at specific levels, and unique nutritional properties and benefits during ambient storage conditions. Separation of the solid particles and fluid ingredients in separate chambers can allow the individual sets of recipe ingredients to maintain taste and aroma qualities when used to manufacture the finished product.

When specific solids ingredients are pre-coated with a binding agent, such as granola or nuts coated with corn syrup or brown rice syrup or honey, then let to dry, and used alone (without a fluid set of ingredients), then the solids set of ingredients can be used directly without a separate fluid set of ingredients. The heating step can ensure that the syrup pre-coats on to granola or nuts to serve as the binding agent.

Caffeine may be used in an amount to simulate the energy derived from a cup of coffee to provide a coffee hit of caffeine in a solid form factor.

The formulations can represent pre-made combination(s) or cluster(s) of two or more ingredients from one of the recipes above.

In accordance with one embodiment of the present invention, a method for preparing a food product is disclosed. The method can comprise obtaining a package having a solid food ingredient disposed therein. The method can also comprise introducing a fluid food ingredient and the solid food ingredient to one another within the package. The method can further comprise mixing the fluid food ingredient and the solid food ingredient to form a food mixture in the package. Additionally, the method can comprise forming the food mixture into a predetermined shape within the package. It is noted that no specific order is required in this method, though generally in one embodiment, these method steps can be carried out sequentially.

In one aspect of the method, the solid food ingredient can be contained within the package by a frangible seal. In another aspect of the method, the fluid food ingredient and the solid food ingredient can be disposed in the package in separate compartments of the package formed at least in part by the frangible seal. In another aspect of the method, introducing the fluid food ingredient and the solid food ingredient to one another within the package can comprise providing a pressurized fluid to one of the compartments to break the frangible seal. In another aspect of the method, forming the food mixture can comprise applying pressure to the food mixture. In another aspect of the method, applying pressure to the food mixture can comprise molding the food mixture. In another aspect of the method, molding the food mixture can comprise compressing the food mixture with a die into the predetermined shape. In another aspect of the method, mixing the fluid food ingredient and the solid food ingredient to form the food mixture in the package can comprise shaking the fluid food ingredient and the solid food ingredient.

In one aspect, the method can further comprise heating at least one of the fluid food ingredient and the solid food ingredient. In one aspect of the method, heating can be sufficient to facilitate homogeneously mixing the fluid food ingredient and the solid food ingredient, and insufficient to cook the fluid food ingredient and the solid food ingredient. In another aspect of the method, the fluid food ingredient can be in a solid state prior to heating. This may yield food products such as salad dressing, (e.g., ranch or Italian dressing) where dry blends are mixed with a liquid blend (water, oil, vinegar, and acid) or water only. An example recipe can include salt 0.5%, dried garlic 1%, modified food starch 1.5%, spices (dill, parsley) 0.5%, maltodextrin 2%, black pepper 0.25%, buttermilk powder 2.5%, egg yolk powder 0.5%, dried flavor 1.0%, Sugar 1.0%, guar gum 0.25%, lactic acid 0.5% encapsulated oils 5%, water 82.5%, and distilled white vinegar 1%.

It could also result in a product like cheese sauce, where dry blends are mixed with water to form an emulsion. An example recipe can include salt 0.5%, mustard powder 0.25%, modified food starch 1.5%, spices 0.5%, maltodextrin 2%, cheese powder 3%, whey powder 2.5%, dried flavor 1.0%, guar gum 0.25%, lactic acid 0.5% encapsulated oils 5%, and water 82%.

In one aspect, the method can further comprise drying the food mixture to remove moisture from the food mixture. In one aspect of the method, drying the food mixture can comprise moving air about the food mixture. In another aspect of the method, drying the food mixture can comprise applying heat to the food mixture. In another aspect of the method, the fluid food ingredient can maintain the food mixture in the predetermined shape upon cooling. In an additional aspect, the food mixture may be dried to a point that its exterior tack is reduced. Hence, in one embodiment, the food mixture (e.g. final food product) can be dried to a point that a degree of external tack or tackiness is reduced as compared to prior to commencement of drying.

In one aspect, the method can further comprise applying a topping to the food mixture formed in the predetermined shape. In one aspect of the method, the solid food ingredient can comprise a plurality of solid food ingredients, and the method can further comprise mixing the plurality of solid food ingredients to form a homogeneous blend of solid food ingredients.

In one aspect of the method, the package can contain the food mixture until consumed. In another aspect of the method, the package can be flexible. In another aspect of the method, the package can be disposable.

In one aspect of the method, a volume ratio of the solid food ingredient to the fluid food ingredient can be between about 65:35 and about 95:5. In another aspect of the method, mixing can be completed in less than about 3 minutes, in some aspects, less than about 1 minute, in an additional aspect, less than about 50 seconds.

The following examples pertain to further specific invention embodiments.

In one example there is provided a food preparation device, comprising:

an ingredient combining apparatus to introduce a fluid food ingredient and a solid food ingredient to one another within a package;

a mixing apparatus to mix the fluid food ingredient and the solid food ingredient to form a food mixture in the package; and a forming apparatus to form the food mixture into a predetermined shape within the package.

In one example of a food preparation device, the package initially includes the solid food ingredient contained at least in part by a frangible seal.

In one example of a food preparation device, the fluid food ingredient and the solid food ingredient are initially contained within separate compartments of the package formed at least in part by the frangible seal.

In one example of a food preparation device, the ingredient combining apparatus comprises a pressurized fluid source fluidly coupleable to the package to provide pressurized fluid to one of the compartments to break the frangible seal.

In one example of a food preparation device, the device further comprises a package securing mechanism to secure the package during operation of the food preparation device.

In one example of a food preparation device, the package securing mechanism comprises a fluid port configured to interface with the package to fluidly couple the pressurized fluid source and the package.

In one example of a food preparation device, the package securing mechanism comprises a clamp configured to engage a portion of the package.

In one example of a food preparation device, at least a portion of the clamp is movable to accommodate inflation of the package by the pressurized fluid.

In one example of a food preparation device, movement of the clamp facilitates determining whether the frangible seal has been broken.

In one example of a food preparation device, the mixing apparatus comprises an orbital shaker.

In one example of a food preparation device, the mixing apparatus further comprises a package support to provide support for the package while forming the food mixture.

In one example of a food preparation device, the forming apparatus comprises a die to form the food mixture into the predetermined shape.

In one example of a food preparation device, the die comprises two dies movable relative to one another to form the food mixture into the predetermined shape.

In one example of a food preparation device, the dies are configured to form a plurality of predetermined shapes.

In one example of a food preparation device, the device further comprises a heating apparatus configured to heat at least one of the fluid food ingredient and the solid food ingredient.

In one example of a food preparation device, the heating apparatus is configured to provide heat sufficient to facilitate homogeneously mixing the fluid food ingredient and the solid food ingredient, and insufficient to cook the fluid food ingredient and the solid food ingredient.

In one example of a food preparation device, the heating apparatus comprises a resistance heater, a convection heater, a radiant heater, or a combination thereof.

In one example of a food preparation device, wherein the device further comprises a drying apparatus to remove moisture from the food mixture.

In one example of a food preparation device, the drying apparatus comprises at least one of a blower, a heater, and a cooling system.

In one example of a food preparation device, the device further comprises a package opening apparatus to create an opening in the package to facilitate removal of moisture from the food mixture by the drying apparatus.

In one example of a food preparation device, the package opening apparatus comprises a cutter.

In one example of a food preparation device, the device further comprises a housing disposed about the ingredient combining apparatus, the mixing apparatus, and the forming apparatus.

In one example of a food preparation device, the device further comprises a receptacle within the housing to receive the package, wherein at least one of the mixing apparatus and the forming apparatus are operable on the package when in the receptacle.

In one example of a food preparation device, the device further comprises a lid for the receptacle, wherein operation of the food preparation device is initiated by closing the lid when the package is disposed in the receptacle.

In one example of a food preparation device, the device further comprises a topping dispenser to apply a topping to the food mixture formed in the predetermined shape.

In one example, there is provided a food preparation system, comprising:

a package having a solid food ingredient disposed therein; and a food preparation device, having an ingredient combining apparatus to introduce a fluid food ingredient and the solid food ingredient to one another within the package, a mixing apparatus to mix the fluid food ingredient and the solid food ingredient to form a food mixture in the package, and a forming apparatus to form the food mixture into a predetermined shape within the package.

In one example of a food preparation system, the solid food ingredient is contained within the package by a frangible seal.

In one example of a food preparation system, the fluid food ingredient and the solid food ingredient are disposed in the package in separate compartments of the package formed at least in part by the frangible seal.

In one example of a food preparation system, the ingredient combining apparatus comprises a pressurized fluid source fluidly coupleable to the package to provide pressurized fluid to one of the compartments to break the frangible seal.

In one example of a food preparation system, the mixing apparatus comprises an orbital shaker.

In one example of a food preparation system, the forming apparatus comprises a die to form the food mixture into the predetermined shape.

In one example of a food preparation system, the system further comprises a heating apparatus configured to heat at least one of the fluid food ingredient and the solid food ingredient.

In one example of a food preparation system, the system further comprises a drying apparatus to remove moisture from the food mixture.

In one example of a food preparation system, the heating apparatus is configured to provide heat sufficient to facilitate homogeneously mixing the fluid food ingredient and the solid food ingredient, and insufficient to cook the fluid food ingredient and the solid food ingredient.

In one example of a food preparation system, the package is flexible.

In one example of a food preparation system, the package is disposable.

In one example of a food preparation system, the package is reusable.

In one example, there is provided a method for preparing a food product, comprising:
  obtaining a package having a solid food ingredient disposed therein;
  introducing a fluid food ingredient and the solid food ingredient to one another within the package;
  mixing the fluid food ingredient and the solid food ingredient to form a food mixture in the package; and
  forming the food mixture into a predetermined shape within the package.

In one example of a food product preparation method, the solid food ingredient is contained within the package by a frangible seal.

In one example of a food product preparation method, the fluid food ingredient and the solid food ingredient are disposed in the package in separate compartments of the package formed at least in part by the frangible seal.

In one example of a food product preparation method, introducing the fluid food ingredient and the solid food ingredient to one another within the package comprises providing a pressurized fluid to one of the compartments to break the frangible seal.

In one example of a food product preparation method, forming the food mixture comprises applying pressure to the food mixture.

In one example of a food product preparation method, applying pressure to the food mixture comprises molding the food mixture.

In one example of a food product preparation method, molding the food mixture comprises compressing the food mixture with a die into the predetermined shape.

In one example of a food product preparation method, mixing the fluid food ingredient and the solid food ingredient to form the food mixture in the package comprises shaking the fluid food ingredient and the solid food ingredient.

In one example of a food product preparation method, the method further comprises heating at least one of the fluid food ingredient and the solid food ingredient.

In one example of a food product preparation method, heating is sufficient to facilitate homogeneously mixing the fluid food ingredient and the solid food ingredient, and insufficient to cook the fluid food ingredient and the solid food ingredient.

In one example of a food product preparation method, the fluid food ingredient is in a solid state prior to heating.

In one example of a food product preparation method, the method further comprises drying the food mixture to remove moisture from the food mixture.

In one example of a food product preparation method, wherein drying the food mixture comprises moving air about the food mixture.

In one example of a food product preparation method, drying the food mixture comprises applying heat to the food mixture.

In one example of a food product preparation method, the fluid food ingredient maintains the food mixture in the predetermined shape upon cooling.

In one example of a food product preparation method, the method further comprises applying a topping to the food mixture formed in the predetermined shape.

In one example of a food product preparation method, the solid food ingredient comprises a plurality of solid food ingredients, and further comprising mixing the plurality of solid food ingredients to form a homogeneous blend of solid food ingredients.

In one example of a food product preparation method, the package contains the food mixture until consumed (i.e. becomes the wrapper for the finished food product).

In one example of a food product preparation method, the package is flexible.

In one example of a food product preparation method, the package is disposable.

In one example of a food product preparation method, a volume ratio of the solid food ingredient to the fluid food ingredient is between about 65:35 and about 95:5.

In one example of a food product preparation method, mixing is completed in less than about three minutes.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A food preparation device, comprising:
  an ingredient combining apparatus operable to introduce a fluid food ingredient and a solid food ingredient to one another within a pre-sealed package;
  a mixing apparatus to mix the fluid food ingredient and the solid food ingredient to form a food mixture in the pre-sealed package; and
  a forming apparatus to form the food mixture into a predetermined shape within the pre-sealed package, wherein the forming apparatus is operable to apply a compressive force on the food mixture; and
  wherein either:
    the ingredient combining apparatus comprises a pressurized fluid source fluidly coupleable to the pre-sealed package via a fluid port configured to interface with the pre-sealed package, the pressurized fluid source being operable to provide pressurized fluid into the pre-sealed package to break a frangible seal separating the fluid food ingredient and the solid food ingredient; or the food preparation device further comprises a blow drying apparatus to remove moisture from the food mixture with forced air.

2. The device of claim 1, further comprising a package securing mechanism to secure the package during operation of the food preparation device.

3. The device of claim 2, wherein the package securing mechanism comprises a fluid port configured to interface with the package to fluidly couple a pressurized fluid source and the package.

4. The device of claim 2, wherein the package securing mechanism comprises a clamp configured to engage a portion of the package.

5. The device of claim 4, wherein at least a portion of the clamp is movable to accommodate inflation of the package by a pressurized fluid.

6. The device of claim 1, wherein the mixing apparatus comprises an orbital shaker.

7. The device of claim 1, wherein the mixing apparatus further comprises a package support to provide support for the package while forming the food mixture.

8. The device of claim 1, wherein the forming apparatus comprises a die operable to apply the compressive force on the food mixture to form the food mixture into the predetermined shape.

9. The device of claim 1, further comprising a heating apparatus configured to heat at least one of the fluid food ingredient and the solid food ingredient.

10. The device of claim 1, further comprising a housing disposed about the ingredient combining apparatus, the mixing apparatus, and the forming apparatus.

11. The device of claim 10, further comprising a receptacle within the housing to receive the package, wherein at least one of the mixing apparatus and the forming apparatus are operable on the package when in the receptacle.

12. The device of claim 1, further comprising a topping dispenser to apply a topping to the food mixture formed in the predetermined shape.

13. The device of claim 1, wherein the forming apparatus is operable to form the food mixture into a cohesive, self-supporting shape within the pre-sealed package.

14. A food preparation system, comprising:
a pre-sealed package having a solid food ingredient disposed therein; and
a food preparation device, having
an ingredient combining apparatus operable to introduce a fluid food ingredient and the solid food ingredient to one another within the pre-sealed package,
a mixing apparatus to mix the fluid food ingredient and the solid food ingredient to form a food mixture in the pre-sealed package, and
a forming apparatus to form the food mixture into a predetermined shape within the pre-sealed package, wherein the forming apparatus is operable to apply a compressive force on the food mixture.

15. The system of claim 14, wherein the solid food ingredient is contained within the package by a frangible seal.

16. The system of claim 15, wherein the fluid food ingredient and the solid food ingredient are disposed in the package in separate compartments of the package formed at least in part by the frangible seal.

17. The system of claim 16, wherein the ingredient combining apparatus comprises a pressurized fluid source fluidly coupleable to the package to provide pressurized fluid to one of the compartments to break the frangible seal.

18. The system of claim 16, wherein the package is flexible.

19. The system of claim 16, wherein the package is disposable.

20. The device of claim 14, wherein the forming apparatus is operable to form the food mixture into a cohesive, self-supporting shape within the pre-sealed package.

* * * * *